(12) United States Patent
Kobayashi et al.

(10) Patent No.: US 8,599,558 B2
(45) Date of Patent: Dec. 3, 2013

(54) CONTROLLER

(75) Inventors: Toru Kobayashi, Odawara (JP);
Shinichi Nishiyama, Ninomiya (JP);
Kenichi Miyamoto, Odawara (JP);
Yoshikatsu Kasahara, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 192 days.

(21) Appl. No.: 13/265,101

(22) PCT Filed: Sep. 28, 2011

(86) PCT No.: PCT/JP2011/005461
§ 371 (c)(1),
(2), (4) Date: Oct. 18, 2011

(87) PCT Pub. No.: WO2013/046262
PCT Pub. Date: Apr. 4, 2013

(65) Prior Publication Data
US 2013/0077243 A1 Mar. 28, 2013

(51) Int. Cl.
*H05K 7/20* (2006.01)
(52) U.S. Cl.
USPC ........... 361/699; 361/690; 361/692; 361/694; 361/704; 361/725; 361/727
(58) Field of Classification Search
None
See application file for complete search history.

(56) References Cited

U.S. PATENT DOCUMENTS

| | | | | |
|---|---|---|---|---|
| 6,134,667 A | * | 10/2000 | Suzuki et al. | 713/300 |
| 6,899,164 B1 | * | 5/2005 | Li et al. | 165/80.3 |
| 7,391,618 B2 | * | 6/2008 | Fujiya et al. | 361/727 |
| 7,394,660 B2 | * | 7/2008 | Hidaka | 361/727 |
| 7,656,669 B2 | * | 2/2010 | Lee et al. | 361/732 |
| 2012/0212899 A1 | * | 8/2012 | Michael et al. | 361/679.37 |
| 2012/0250262 A1 | * | 10/2012 | Faucheux et al. | 361/725 |

FOREIGN PATENT DOCUMENTS

JP 2005-335761 12/1993

* cited by examiner

*Primary Examiner* — Boris Chervinsky
(74) *Attorney, Agent, or Firm* — Foley & Lardner LLP

(57) ABSTRACT

A control unit is proposed which makes it possible to prevent connection problems between a package box and a backboard and prevent damage to the connector of the backboard.
The control unit comprises a unit cover in which a first package box, which comprises a predetermined function and on the rear side of which a first connector is provided, is inserted into the corresponding spatial area so as to move over a shelf from an open end [of the unit cover]; and a backboard which is disposed inside the unit cover and on which a second connector is provided in a position where the first package box, inserted in the corresponding spatial area, mates with the first connector, wherein the shelf is provided with a protrusion which rotatably supports the first package box in a fan direction.

7 Claims, 22 Drawing Sheets

(A)  (B)

FIG. 27
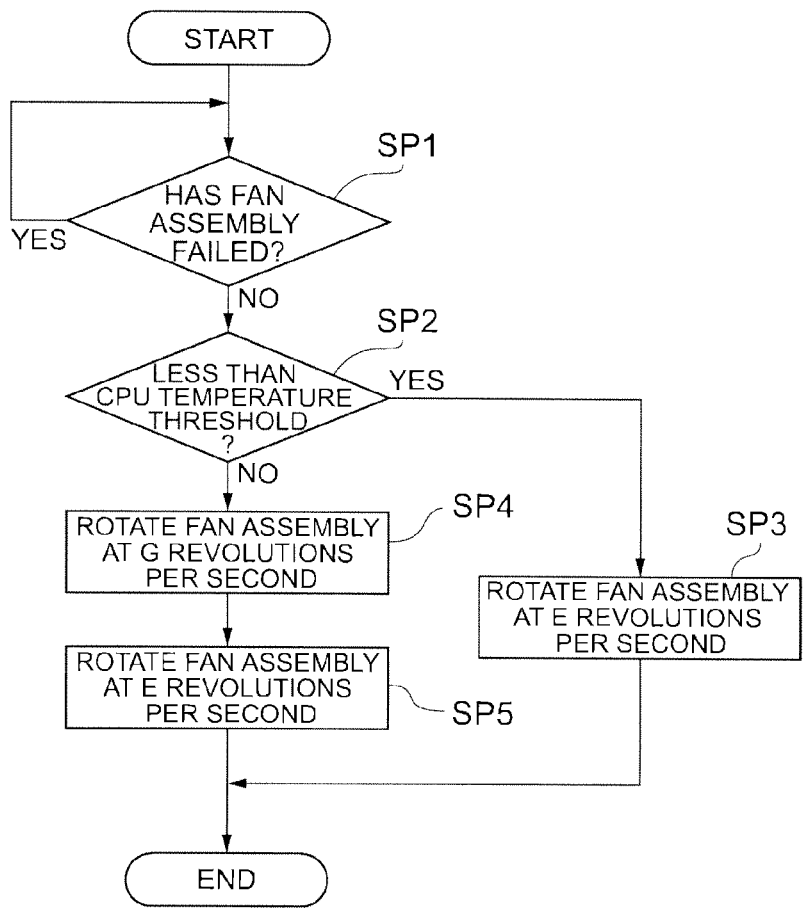
FIG. 28
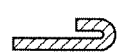 FOLDED STRUCTURE
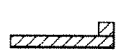 WELDED STRUCTURE
(A)                    (B)

CONTROLLER

TECHNICAL FIELD

The present invention relates to a controller which is suitably applied to a control unit for controlling a disk array device, for example.

BACKGROUND ART

A control unit of a disk array device is conventionally configured from package boxes of a plurality of types which are divided into modules according to function. In the case of a control unit of this type, an enclosure (hereinafter called a unit cover) for storing the package boxes is formed with a cylindrical shape and the interior of the unit cover is divided by racks (hereinafter referred to as shelves) into a plurality of spatial areas of sizes corresponding to individual package boxes and configured so that the package boxes corresponding to each of these spatial areas can be mounted from the front or rear side.

In this case, a connector of a predetermined shape is provided on the rear side of each package box. Furthermore, a backboard is provided, perpendicular to the direction of insertion of the package units, inside the unit cover, and the backboard is provided with connectors which correspond to the respective connectors of each package box.

Accordingly, the control unit is designed so that, by inserting each package box into the unit cover, the connectors of the package boxes can be mated with the corresponding connectors of the backboard and so that each of the package boxes can be physically and electrically connected to the backboard.

CITATION LIST

Patent Literature

PTL 1: Japanese Published Unexamined Application No. H5-335761

SUMMARY OF INVENTION

Technical Problem

Furthermore, PTL1 discloses, as a configuration for housing the package boxes in a control unit, a printed plate unit plug-in structure which is obtained by loading shelves in the unit cover and plugging in, in parallel, printed plate units created by configuring circuits on printed wiring boards. According to PTL1, high-density mounting is obtained by way of three-dimensional housing.

However, with the configuration disclosed in PTL1, there is a problem in that the connection between the package boxes and backboard is lost when the mount position of the connectors mounted on the backboard is shifted from a prescribed position due to erection tolerance or the like, or in that a load (weight) is exerted by the package boxes on the connectors of the backboard.

The present invention was conceived in view of the foregoing and proposes a controller capable of solving all of the foregoing problems.

Solution to Problem

In order to achieve the foregoing object, the present invention comprises a first package box which comprises a predetermined function and on the rear side of which a first connector is provided; a unit cover which is open at at least one end in a depth direction, the interior of which is partitioned by a shelf into a plurality of spatial areas, and in which the first package box is inserted into the corresponding spatial area so as to move over the shelf from the open end; and a backboard which is disposed inside the unit cover and on which a second connector is provided in a position where the first package box, inserted in the corresponding spatial area, mates with the first connector, wherein the shelf is provided with a protrusion which rotatably supports the first package box in a fan direction.

Advantageous Effects of Invention

According to the present invention, a control unit can be realized which makes it possible to prevent connection problems between a package box and a backboard and prevent damage to a connector of the backboard.

BRIEF DESCRIPTION OF DRAWINGS

FIG. 27 is a flowchart showing a processing routine of fan cooling amount control processing.

FIG. 28A is a cross-sectional view showing a modification of a shelf protrusion. FIG. 28B is a cross-sectional view showing a modification of the shelf protrusion.

DESCRIPTION OF EMBODIMENTS

An embodiment of the present invention will be described in detail hereinbelow with reference to the drawings.

(1) Configuration of Disk Array Device According to this Embodiment

Figure 1:
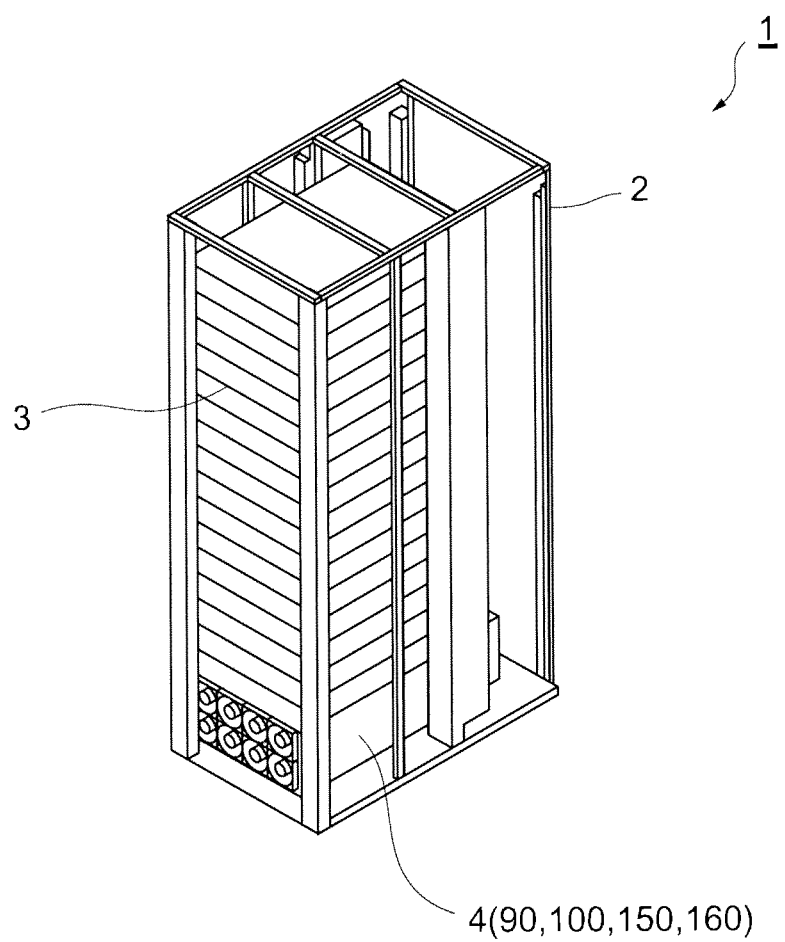
FIG. 1 is a perspective view showing an example of the configuration of a disk array device according to this embodiment.

In FIG. 1, 1 generally denotes a disk array device 1 according to this embodiment. This disk array device 1 is configured such that a control unit 4 and a plurality of disk units 3 are stored in a stacked state in a system rack 2.

The disk units 3 are storage devices which provide logical volumes to a host computer (not shown), and are configured comprising a packaged plurality of disk devices. The disk devices adopted are high-cost disks such as SCSI (Small Computer System Interface) disks or low-cost disks such as SATA (Serial AT Attachment) disks, for example.

Figure 2:
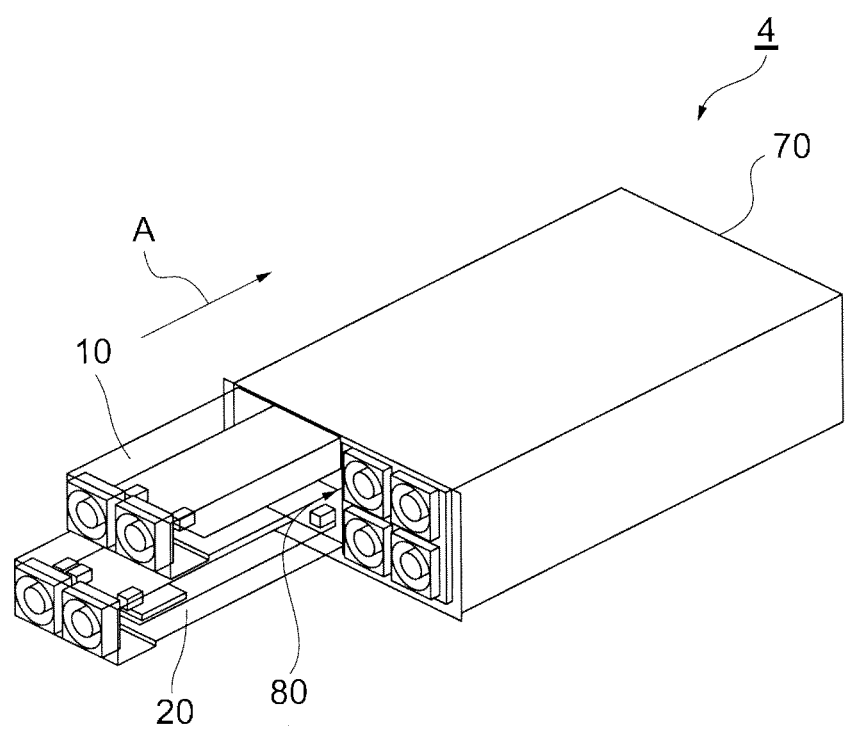
FIG. 2 is a perspective view showing an example of the configuration of a control unit of a conventional disk array device.

The control unit 4 is a system component which controls the reading and writing of data from/to the storage areas provided by the disk units 3 and, as shown in FIG. 2, is configured comprising a plurality of right-angled parallelepiped-shaped package boxes mounted in a cylindrical unit cover 70.

Figure 3:
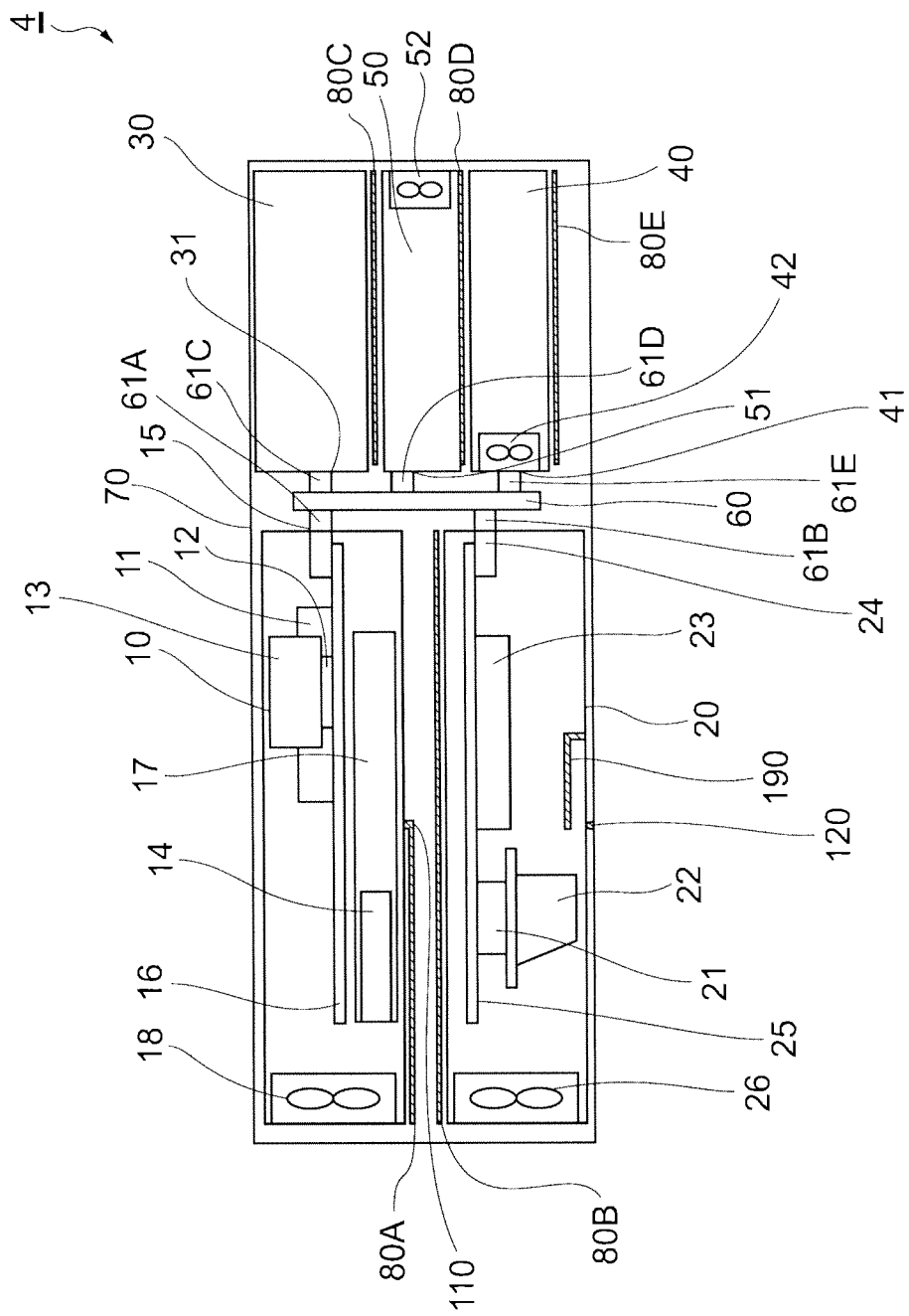
FIG. 3 is a cross-sectional view showing an example of the configuration of a control unit of a disk array device shown in FIG. 1.

The unit cover 70 is configured from metal material, for example, and, as shown in FIG. 3, the interior of the unit cover 70 is partitioned to form a plurality of spatial areas by means of shelves 80 (80A to 80E) integrally formed with the unit cover 70. As a result, in the control unit 4, each of the package boxes can be mounted in the unit cover 70 by being inserted in the corresponding spatial areas from the front or rear side of the unit cover 70.

Meanwhile, the control unit 4 comprises, as package boxes, a main package box 10, a main processor package box 20, an interface package box 30, a service processor package box 40, and a switching power source package box 50.

The main package box 10 is a package box which provides a cache area for temporarily storing data which is read from/written to the disk unit 3, and is configured from a printed wiring board 16 whereon a cache memory 11, a CPU chip 12, a heat sink 13, a backup memory chip 14, and a connector 15 are mounted, a battery 17, and a fan assembly 18.

The cache memory 11 is configured from a volatile memory such as a DIMM (Dual Inline Memory Module), for example, and provides the foregoing cache area. Further, the CPU chip 12 is a processor which controls the reading and writing of data from/to the cache area. The heat sink 13 for cooling the CPU chip 12 is fixed atop the CPU chip 12.

The backup memory chip 14 is configured from a large-capacity storage device such as an SSD (Solid State Drive), for example, and is used to backup the data stored in the cache memory 11 at the time of a power outage or the like.

The connector 15 is, as mentioned earlier, an electronic part for electrically and physically connecting the main package box 10 to the backboard 60 and is mounted on a printed wiring board 25 so as to lie in a predetermined position on the rear side of the main package box 10.

The battery 17 is used as a reserve power source for supplying power to each part in the main package box 10 when a power outage arises or when a fault occurs in the switching power source package box 14 (described subsequently). The battery 17 is electrically connected to a printed wiring board 16 via a cable (not shown) and, while receiving the supply of a charging current from the printed wiring board 16 via the cable during normal operation, supplies a drive current to the CPU chip 12, the cache memory 11, and the backup memory chip 14 which are mounted on the printed wiring board 16 via the cable at the time of a power outage.

The fan assembly 18 is an assembly which comprises a fan for introducing air to the main package box 10. The fan assembly 18 is connected to the printed wiring board 16 via a cable, not shown, and is drive-controlled by the CPU chip 12.

Meanwhile, the main processor package box 20 is a package box which performs control of the overall operation of the disk array device 1 and is configured from a printed wiring board 25 whereon a CPU chip 27, a heat sink 22, a shared memory 23, and a connector 24 are mounted, and a fan assembly 26.

The CPU chip 21 is a chip whereon one or more processors which govern the operational control of the whole disk array device 1. Furthermore, the shared memory 23 is configured from a DIMM or the like, for example, and is used as a shared memory which is shared by each of the processors formed on the CPU chip 21. This shared memory 23 stores configuration information of the disk array device 1 as well as commands and the like from the host computer (not shown).

The heat sink 22, connector 24, and fan assembly 26 has the same configuration and function as the heat sink 22, connector 15, and fan assembly 18 of the main package box 10, and hence a description thereof is not provided here. Note that the connector 15 is mounted on the printed wiring board 25 so as to lie in a predetermined position on the rear side of the main processor package box 20.

The interface package box 30 is a package box which comprises a function for performing protocol control during communications with the host computer (not shown) and each of the disk units 3. A connector 31 is disposed in a predetermined position on the rear side of the interface package box 30.

The service processor package box 40 is a package box which comprises a function for collecting various information in the disk array device 1 in response to requests from an external computer (not shown) and for executing processing such as configuring the disk array device 1 in various ways in response to the requests from the external computer, and comprises a connector 41 and a fan assembly 42.

The connector 41 and fan assembly 42 comprise the same configuration and functions as the main package box 10 and are therefore not described here. Note that the connector 41 is disposed in a predetermined position on the rear side of the service processor package box 40.

The switching power source package box 50 is a package box with a function for stepping down commercial power taken from a commercial power outlet to a predetermined voltage and supplying the power to individual package boxes, and comprises a connector 51 and a fan assembly 52.

The connector 51 and the fan assembly 52 comprise the same configuration and function as the main package box 10 and hence details will not be provided here. Note that the connector 51 is disposed in a predetermined position on the rear side of the switching power supply package box 50 similarly to the other package box.

Figure 4:
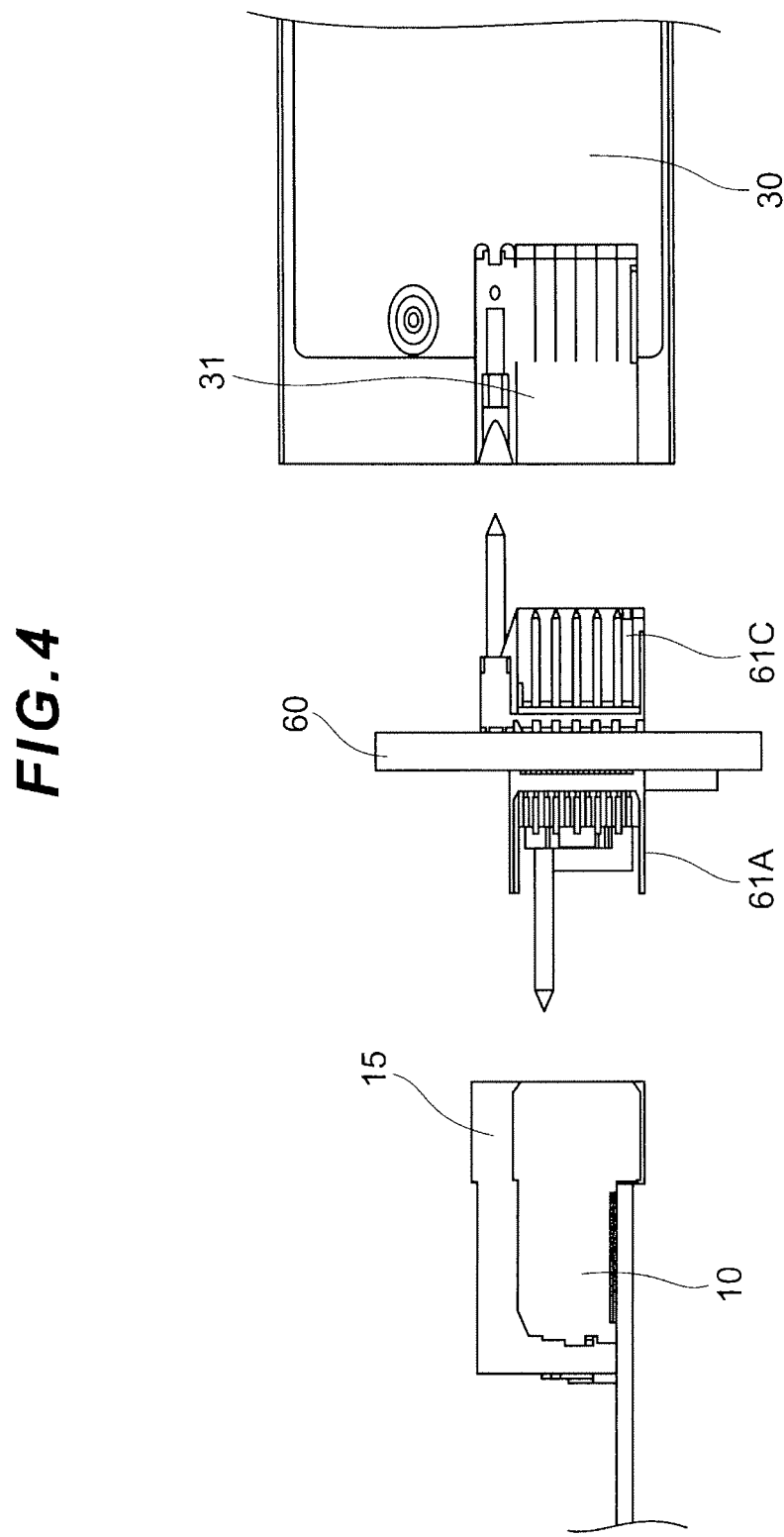
FIG. 4 is a cross-sectional view showing an example of the configuration of a package box connector and corresponding backboard connector.

Meanwhile, the backboard 60 is disposed inside the unit cover 70 and fixed perpendicular to the depth direction in a predetermined position in the depth direction of the unit cover 70 indicated by the arrow A. The backboard 60 has a predetermined wiring pattern formed thereon and, as shown in FIG. 4, a plurality of connectors 61 (61A, 61B, 61C, 61D, 61E) are arranged so as to correspond to the connectors 15, 24, 31, 41, and 51 disposed on the rear side of each of the package boxes as mentioned earlier.

Accordingly, by inserting each of the package boxes into the corresponding spatial areas in the unit cover 70, in the control unit 4, it is possible to mate the connectors 15, 24, 31, 41, and 51 provided on the rear sides of the package boxes with the corresponding connectors 61 (61A, 61B, 61C, 61D, 61E) of the backboard 60 and in this way the individual package boxes can be electrically and physically integrated with the backboard 60.

(2) Shelf Configuration in Control Unit of this Embodiment

The configuration of the shelves 80 of the control unit 4 will be described next. At this time, the configuration of a conventional control unit 61 will first be described.

Figure 5:
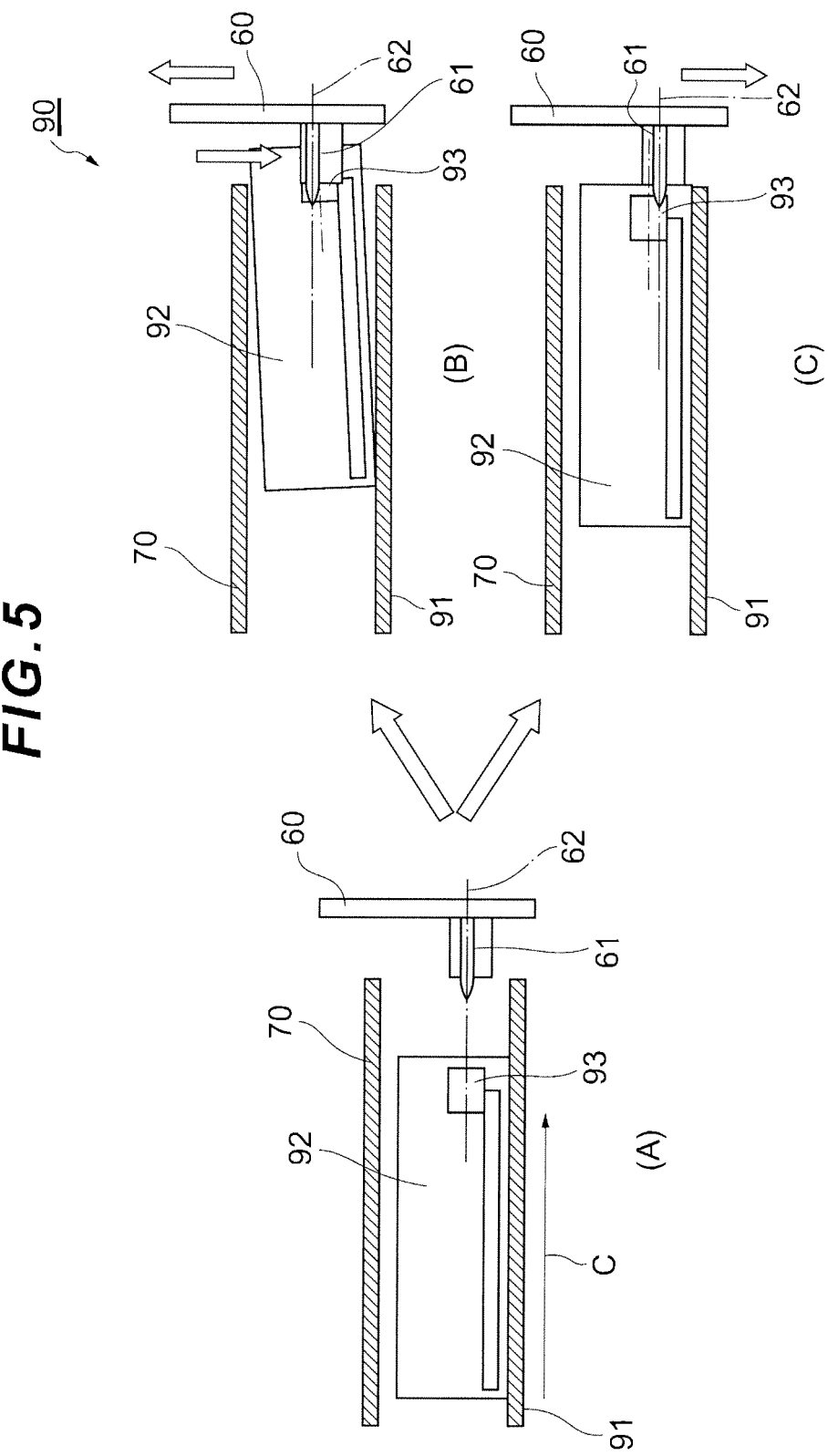
FIG. 5A is a cross-sectional view showing an example of the configuration of a conventional control unit.
FIG. 5B is a cross-sectional view which serves to illustrate the load on the connector of the backboard in a mated state.
FIG. 5C is a cross-sectional view which serves to illustrate the load on the connector of the backboard in a mated state.

FIG. 5A, to which the same reference signs as parts corresponding to FIG. 2 are assigned, shows an example of the configuration of a conventional control unit 90. So too in the case of the conventional control unit 90, similarly to the control unit 4 according to this embodiment, the interior of the unit cover 70 is partitioned by shelves 91 into a plurality of spatial areas, and the package boxes 92 are each housed in the unit cover 70 through insertion in the corresponding spatial areas.

Here, the package boxes 92 each slide, under their own weight, over the upper surface of the corresponding shelf 91, and the connector 93 disposed on the rear side of the package box 92 mates with the corresponding connector 61 which is disposed in a predetermined position of the backboard 60 which is fixed inside the unit cover 70, and is pushed into the spatial areas.

In this case, conventionally, the connectors 61 of the backboard 60 are not necessarily limited to being attached in the originally attached position (hereinafter this is called the standard position) 62 and are, for example, attached after sliding from the reference position 62 to a high position or low position due to erection tolerance.

Furthermore, if the connectors 61 (61A, 61B, 61C, 61D, 61E) of the backboard 60 are attached in a higher position than reference position 62, when the connector of the package box 92 and the connectors 61 (61A, 61B, 61C, 61D, 61E) of the backboard 60 are, as shown in FIG. 5B, mated with one another, the rear side of the package box 92 rises up from the upper surface of the shelf 91 and there is a problem in that there is a load in the gravity direction which acts on the connectors 61 (61A, 61B, 61C, 61D, 61E) of the backboard 60 and which corresponds to the weight of the package boxes 92 and the tilted state of the package box 92.

Furthermore, if the connectors 61 (61A, 61B, 61C, 61D, 61E) of the backboard 60 are attached in a position below the standard position 62, as shown in FIG. 5C, there is a problem in that the connector 93 of the package box 92 cannot be mated with the connectors 61 (61A, 61B, 61C, 61D, 61E) on the backboard 60 and there is a connection problem between the package box 92 and the backboard 60.

Figure 6:
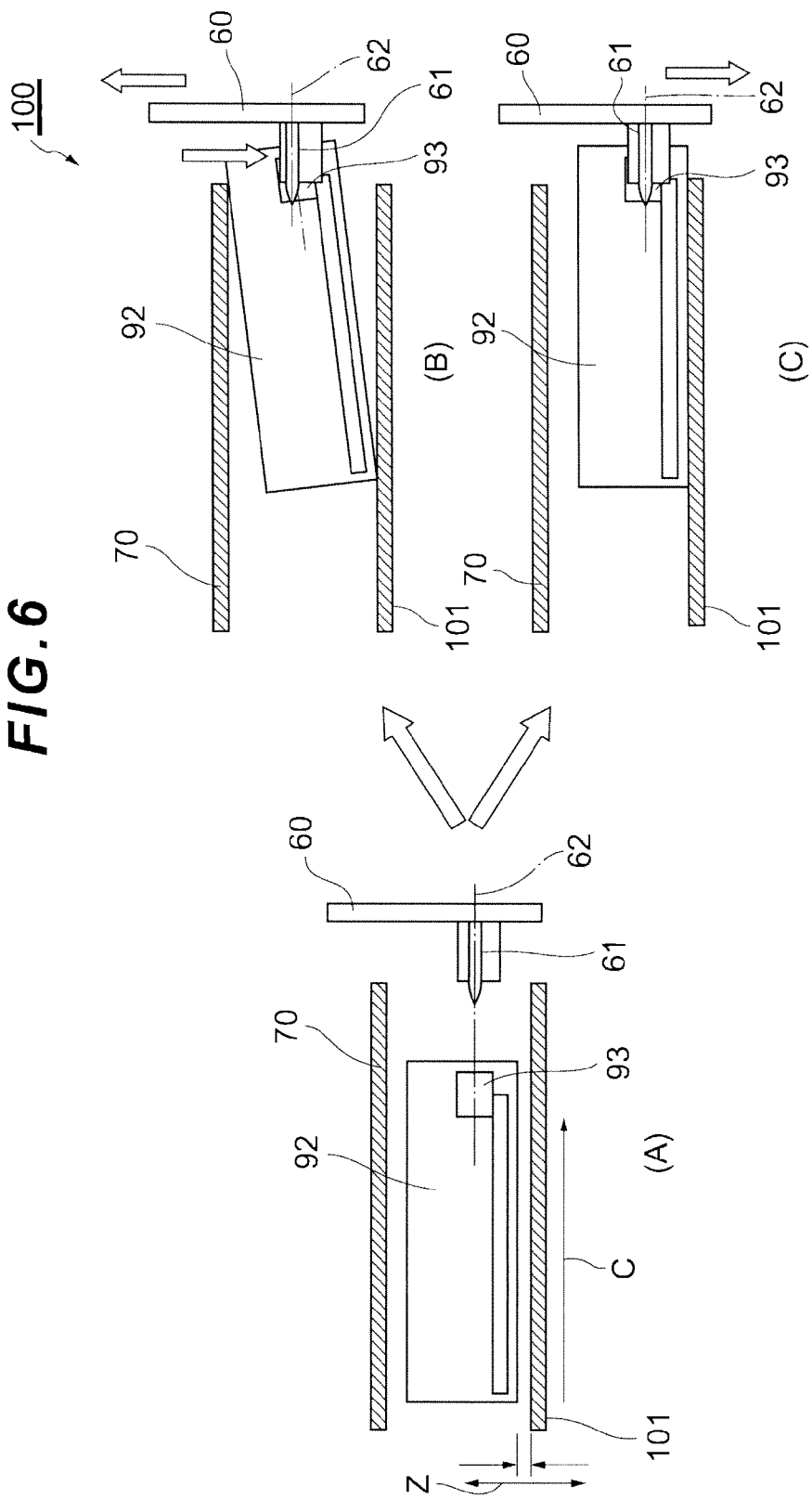
FIG. 6A is a cross-sectional view showing an example of the configuration of a conventional control unit.
FIG. 6B is a cross-sectional view which serves to illustrate the load on the connector of the backboard in a mated state.
FIG. 6C is a cross-sectional view which serves to illustrate the load on the connector of the backboard in a mated state.

Here, as a countermeasure in a case where the connectors 61A, 61B, 61C, 61D, 61E of the backboard 60 are attached in a position below the standard position 62, consideration has been given to changing the position of the shelf 101 in the unit cover 70 to a position below the reference position 62 (position in FIG. 5A) which is shifted by an amount equivalent to the maximum value of the erection tolerance of the connector on the printed wiring substrate, as shown in FIG. 6A, for example. Furthermore, with this method, even in a case where the connector 61 (61A, 61B, 61C, 61D, 61E) of the backboard 60 is attached in a position below the standard position 62, the connector 61 (61A, 61B, 61C, 61D, 61E) of the backboard 60 and the connector 93 of the package box 92 can be reliably mated with one another, as shown in FIG. 6C.

However, this method does not cater to a case where the connector 61 (61A, 61B, 61C, 61D, 61E) of the backboard 60 is attached in a position above the standard position 62 as shown in FIG. 6B, and as such is unable to solve the problem of the load in the gravity direction which acts on the connectors 61 (61A, 61B, 61C, 61D, 61E) of the backboard 60 which corresponds to the weight and tilt angle of the package box 92.

On that basis, recent years have witnessed an increase in the weight of the main package box 10 in particular due to the increase in capacity of the installed battery 17 and capacity of the cache memory 11. There has therefore also been an increase in the load exerted on the connector 61A of the backboard 60 by the main package box 10 in states such as that shown in FIG. 5B or FIG. 6B. As a result, there is a risk of the connector 61A of the backboard 60 breaking under this load.

Hence, one characteristic of the disk array device 1 according to this embodiment is that the control unit 4 is configured to prevent connection problems due to erection tolerance and damage to the connectors 61 (61A, 61B, 61C, 61D, 61E) of the backboard 60.

In reality, with the control unit 4 of this embodiment, in particular the shelf in which the main package box 10 moves when the main package box 10 is introduced to the unit cover 70 (that is, the shelf 80A whereon the main package box 10 is mounted) is formed such that the length [of the shelf] in the depth direction is shorter than the length in the depth direction of the main package box 10.

More specifically, the length in the depth direction of the shelf 80A is chosen so that, when the main package box 10 is mounted in the unit cover 70 (that is, in a state where the connector 15 of the main package box 10 is mated with the connector 61A of the backboard 60), the edge of the backboard is positioned on a straight line perpendicular to the depth direction of the unit cover 70 and passing through the lower side at the gravity center of the main package box 10, as shown in FIG. 3.

Furthermore, a linear protrusion 110 which protrudes in a direction opposite the gravity direction is, as shown in FIG. 7 and FIGS. 8A to 8C, formed on the edge, on the backboard 60 side, of the shelf 80A and parallel to a direction perpendicular to the depth direction of the unit cover 70 through crushing and bending, for example.

Figure 9:
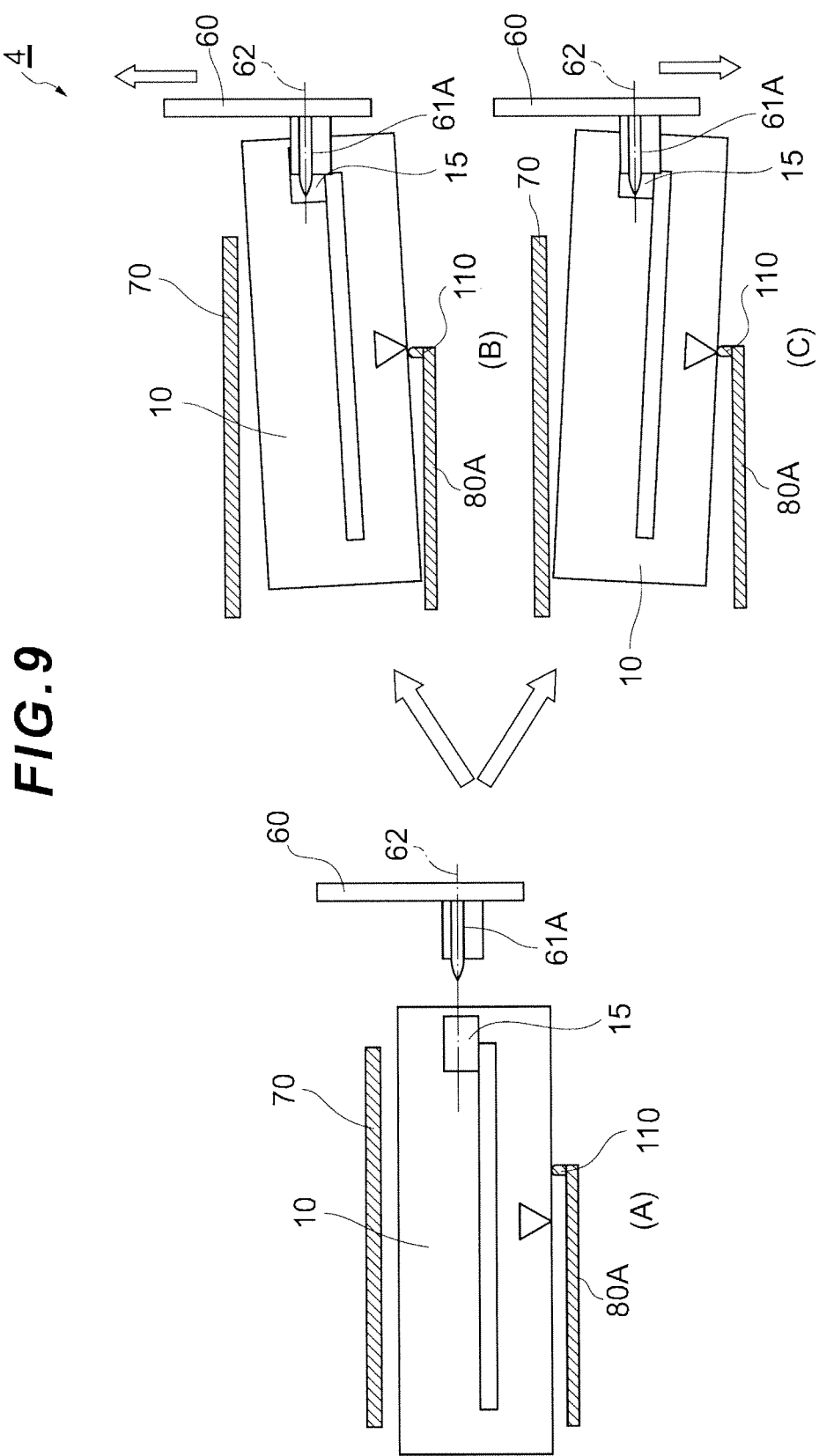
FIG. 9A is a cross-sectional view showing an example of the configuration of the control unit according to this embodiment.
FIG. 9B is a cross-sectional view serving to illustrate the load on the backboard connectors in a mated state.
FIG. 9C is a cross-sectional view serving to illustrate the load on the backboard connectors in a mated state.

As a result, when the main package box 10 is introduced to the unit cover 70 in the control unit 4, as shown in FIG. 9A, with the protrusion 110 of the shelf 80A serving as the pivot, the main package box 10 can be easily rotated within a predetermined range in the fan direction (direction of rotation about an axis parallel to the upper surface of the shelf 80A and perpendicular to the depth direction of the unit cover 70).

In this case, the height of the protrusion 110 of the shelf 80A is selected as a height which, by rotating the main package box 10 in the fan direction, enables displacement of the connector 15 provided on the rear surface of the main package box 10 in an upward and downward direction in a wider range than the probable range within which the connector 61A of the backboard 60 is attached due to erection tolerance.

Even if, in the control unit 4, the connector 61A of the backboard 60 is accordingly attached in a position below the standard position 62 due to erection tolerance, the connector 15 of the main package box 10 can be positioned opposite the connector 61A of the backboard 60 by rotating the main package box 10 in a fan direction and, by pushing the main package box 10 into the unit cover 70 strongly in this state, the connector 15 of the main package box 10 and the corresponding connector 61A of the backboard 60 can be reliably mated with one another as shown in FIG. 9C.

In addition, even if, in the control unit 4, the connector 61A of the backboard 60 is attached in a position above the standard position 62 due to erection tolerance, since the lower position at the gravity center of the main package box 10 is supported by the protrusion 110 of the shelf 80A as shown in FIG. 9B, the load that is exerted on the connector 61A of the backboard 60 by the main package box 10 can be adjusted in a state where the connector 15 of the main package box 10 is mated with the connector 61A of the backboard 60.

The theory behind configuring the control unit 4 in the way described above in order to lighten the load exerted by the main package box 10 on the connector 61A of the backboard 60 if the connector 15 of the backboard 60 is attached in a position above the standard position 62 will now be explained.

Figure 10:
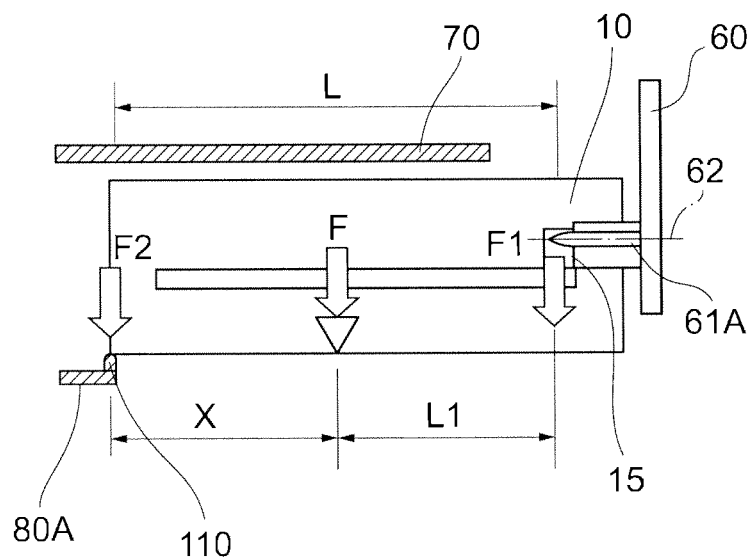
FIG. 10 is a cross-sectional view serving to illustrate the load on the backboard connectors in a mated state.

As shown in FIG. 10, the following equation is valid according to the balance of force moments when L is the distance from the front of the main package box 10 to the connector, X is the distance from the gravity center of the main package box 10 to the protrusion of the shelf 80A, L1 is the distance from the gravity center of the main package box 10 to the connector 15 of the main package box 10, F1 is the force in the weight direction which the main package box 10 exerts on the connector 61A of the backboard 60, and F2 is the force which the main package box 10 receives from the protrusion 110 of the shelf 80A.

Math 1

$$F1(L1+X)=F2X \tag{1}$$

According to Equation (1), a force F1 in the weight direction, which the connector 61A of the backboard 60 receives from the main package box 10, can be expressed by the following equation.

Math 2

$$F1=F2X/(L1+X) \tag{2}$$

Figure 11:
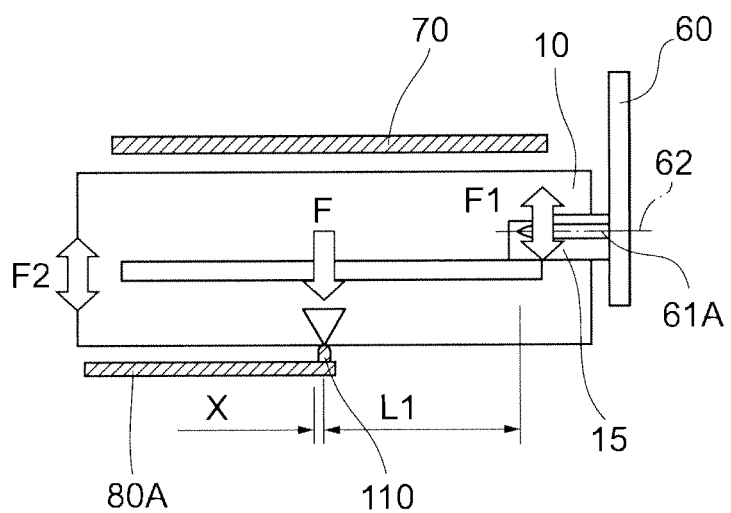
FIG. 11 is a cross-sectional view serving to illustrate the load on the backboard connectors in a mated state.

In equation (2), the absolute value of the force F1 is a minimum value when the value of X is "0" and the value of force F1 is then "0". Accordingly, if the control unit 4 is formed so that, when the main package box 10 is mounted in the unit cover 70, the protrusion 110 of the shelf 80A is positioned on a straight line perpendicular to the depth direction of the unit cover 70 and passing through the lower side at the gravity center of the main package box 10 as shown in FIG. 11, in a case where the connector 61A of the backboard 60 is attached displaced upward from the standard position 62, the load exerted by the main package box 10 on the connector 61A of the backboard 60 can be lightened.

Figure 12:
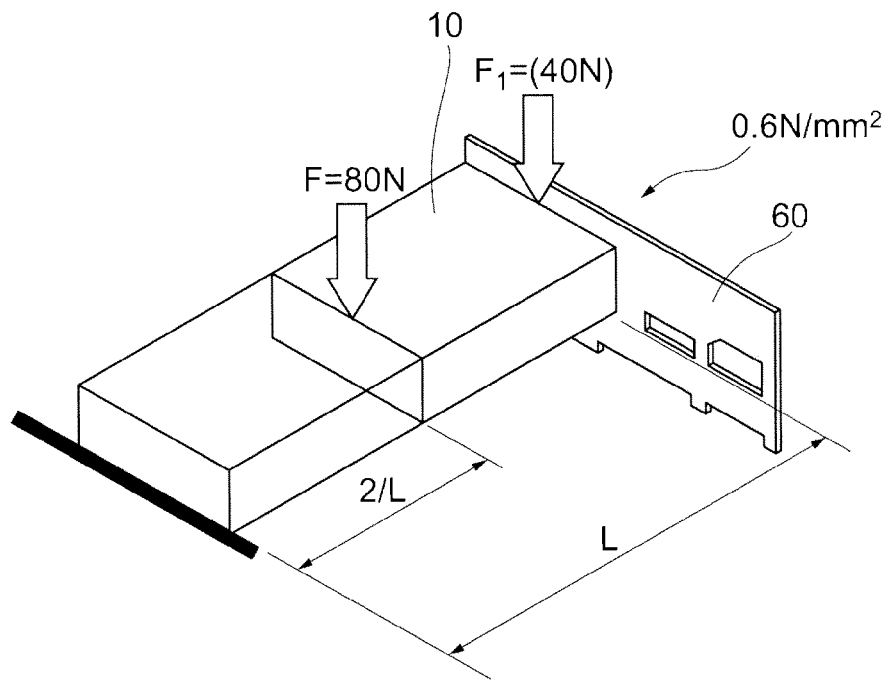
FIG. 12 shows a simulation effect for the load on the backboard connectors in a mated state.
Figure 13:
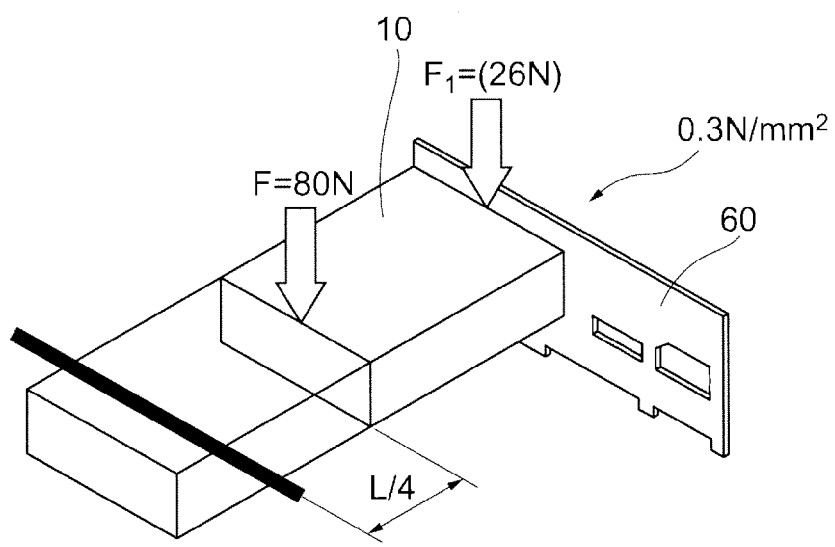
FIG. 13 shows a simulation effect for the load on the backboard connectors in a mated state.

Note that a study was performed on the size of the load exerted by the main package box on the connector 61A of the backboard 60 in a case where, as shown in FIG. 12, for example, the control unit is configured so that, in a state where the main package box 10 is mounted in the unit cover 70, the protrusion 110 of the shelf 80 is positioned at the front edge on the bottom surface of the main package box 10 or in a case where, as shown in FIG. 13, the control unit is configured so that the protrusion 110 of the shelf 80A is positioned L/4 apart in the depth direction from the front edge of the bottom surface of the main package box 10.

If the main package box 10 is configured as per FIG. 12, assuming that the gravity center of the main package box 10 is in a central position from the front side of the main package box 10 to the connector 61A, that the force in the depth direction due to its own weight in the central position of the main package box 10 is 80 [N] and that the cross-sectional area of the connector 61A of the backboard 60 is 67 [mm], the force which the connector 61A of the backboard 60 receives from the main package box 10 when the main package box 10 is mounted in the unit cover 70 is calculated using Equation (2) as 40 [N]. The maximum stress per 1 [mm$^2$] of the connector 61A of the backboard 60 in this case is 0.6 [N/mm$^2$].

If the package box 4 is configured as per FIG. 13, based on the foregoing conditions, the force which the connector 61A of the backboard 60 receives from the main package box 10 is calculated as 26.6 [N] using Equation (2). The maximum stress per 1 [mm$^2$] of the connector 61A of the backboard 60 in this case is 0.3 [N/mm$^2$].

As is also clear from the foregoing study, the weight exerted by the main package box 10 on the connector 61A of the backboard 60 can be alleviated even when the position (hereinafter called the support position) supporting the main package box 10 by the protrusion 110 of shelf 80A is displaced from the lower side at the gravity center of the main package box 10, but it can be seen that the load exerted by the main package box 10 on the connector 61A of the backboard 60 grows smaller as the support position approaches the lower side at the gravity center of the main package box 10. Furthermore, as per this embodiment, the load exerted by the main package box 10 on the connector 61A of the backboard 60 can be made "0" as a result of the gravity center of the main package box 10 being supported by the protrusion 110 of the shelf 80A.

Incidentally, providing the protrusion 110 on the edge, on the backboard 60 side of the shelf 80A, as per the control unit 4, also affords the effect of reducing the warping and bending of the shelf 80A.

In reality, supposing that the protruding shape of the edge of shelf 80 is rectangular, the thickness is h, and the width of the edge of the shelf 80A is b, the section modulus I of the edge on the backboard 60 side of the shelf 80A is calculated by the following equation.

Math 3

$$I = bh^3/12 \tag{3}$$

As is also clear from Equation (3), the section modulus I, which indicates the difficulty of deformation of the edge on the backboard 60 side is proportional to the thickness h cubed of the edge of the shelf 80A, and therefore the larger the thickness h, the greater the section modulus I of the shelf 80. For example, in a case where the width of the edge of the shelf 80A is 1 [mm], while the section modulus I is 0.083 [mm$^4$] when the thickness of the edge is 1 [mm], the section modulus I is 0.667 [mm$^4$] when the thickness of the edge of the shelf 80A is 2 [mm].

Thus, because the greater the thickness of the shelf 80A, the greater the section modulus I is, warping and bending of the shelf 80A can be reduced by providing the shelf 80A with the protrusion 110 as per this embodiment.

Note that, in the case of this embodiment, as shown in FIG. 3, a protrusion 120 which has the same configuration as the protrusion 110 of the shelf 80A is provided on the inside lower surface of the unit cover 70 whereon the main processor package box 20 is mounted so that, when mounted in the unit cover 70 (that is, in a state where the connector 24 of the main processor package box 20 is mated with the connector 61B of the backboard 60), the protrusion 120 is positioned on the lower side at the gravity center of the main processor package box 20.

The control unit 4 is accordingly devised so that even if the connector 61A of the backboard 60 is accordingly attached in a position below the standard position 62 due to erection tolerance, the connector 24 of the main processor package box 20 can be reliably mated with the corresponding connector 60B of the backboard 60, and so that even in a case where the connector 60B of the backboard 60 is attached in a position higher than the standard position 62, the main processor package box 20 can be effectively prevented from exerting a load on the connector 61B of the backboard 60 in a state where the main processor package box 20 is mounted.

(3) Heat Venting Structure of Control Unit

A heat venting structure of the control unit 4 according to this embodiment will be described next using FIGS. 14 to 20. The control unit 4 comprises a built-in heat venting function for venting heat which is generated within the control unit 4.

Figure 14:
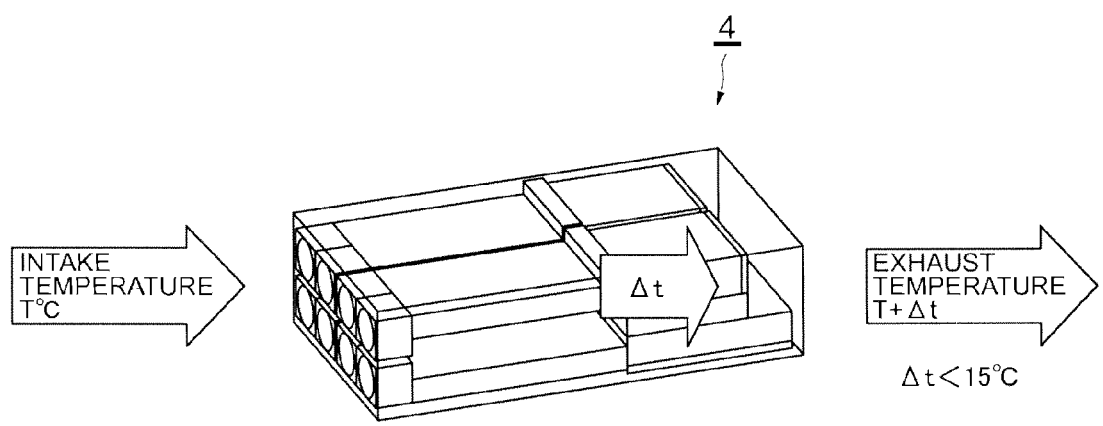
FIG. 14 is a conceptual view showing an aspect in which heat generated in the control unit is discharged outside the control unit.

As shown in FIG. 14, if air is drawn in at an intake temperature T degree Celsius, the control unit 14 exhausts heat to the outside at a temperature of T degree Celsius+delta t degree Celsius degrees which results from a temperature increase equivalent to the heat amount delta t degree Celsius generated in the control unit 4.

Figure 15:
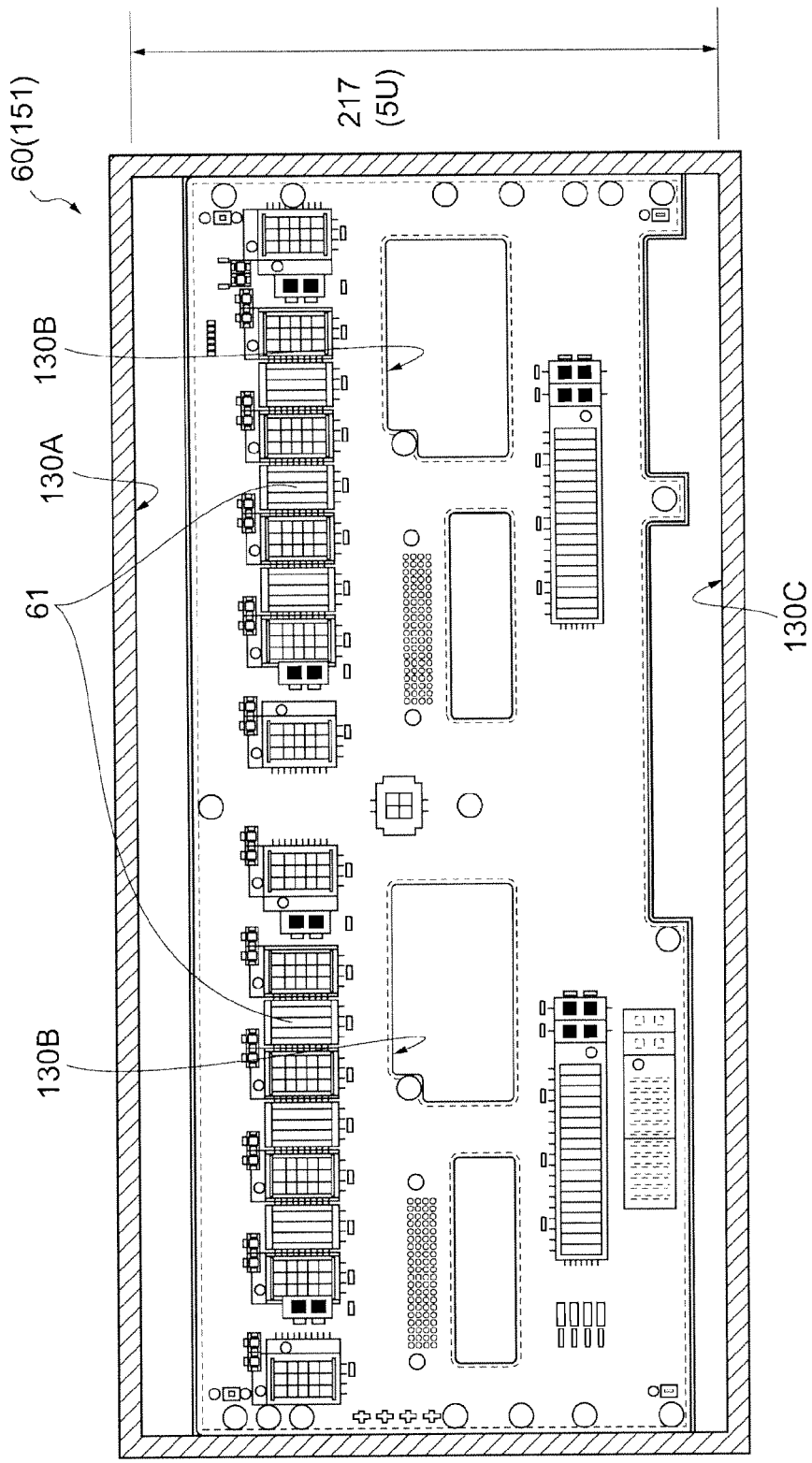
FIG. 15 is a front view showing a backboard serving to illustrate the flow path of the cooling air in the control unit.

Further, as shown in FIG. 15, by forming the length of the backboard 60 in the height direction shorter than the length in the height direction of the inside of the unit cover 70, a gap 130A for the passage of a flow path X which cools the upper portion of the control unit 4 is formed by the upper portion of the backboard 60 and the unit cover 70 of the control unit 4. Meanwhile, a gap 130C for the passage of a flow path Z which cools the lower portion of the control unit 5 is formed by the lower portion of the backboard 60 and the unit cover 70 of the control unit 4.

Furthermore, an opening 130B is provided in the backboard 60 and a flow path Y which passes through the center of the control unit 4 is formed in the backboard 60.

Further, the gap 130A is formed in the upper portion of the backboard 60 and parallel to the width direction of the unit cover 70. In addition, the opening 130B is formed having an approximately oblong shape and in two locations in the center of the backboard 60. Furthermore, the gap 130C is formed in the lower portion of the backboard 60 and parallel to the width direction of the unit cover 70.

As a result, the flow paths of the control unit 4 are each able to exhaust the heat generated in the control unit 4 via the gaps 130A and 130C formed by the backboard 60 and unit cover 70 and the opening 130B provided in the backboard 60.

Figure 16:
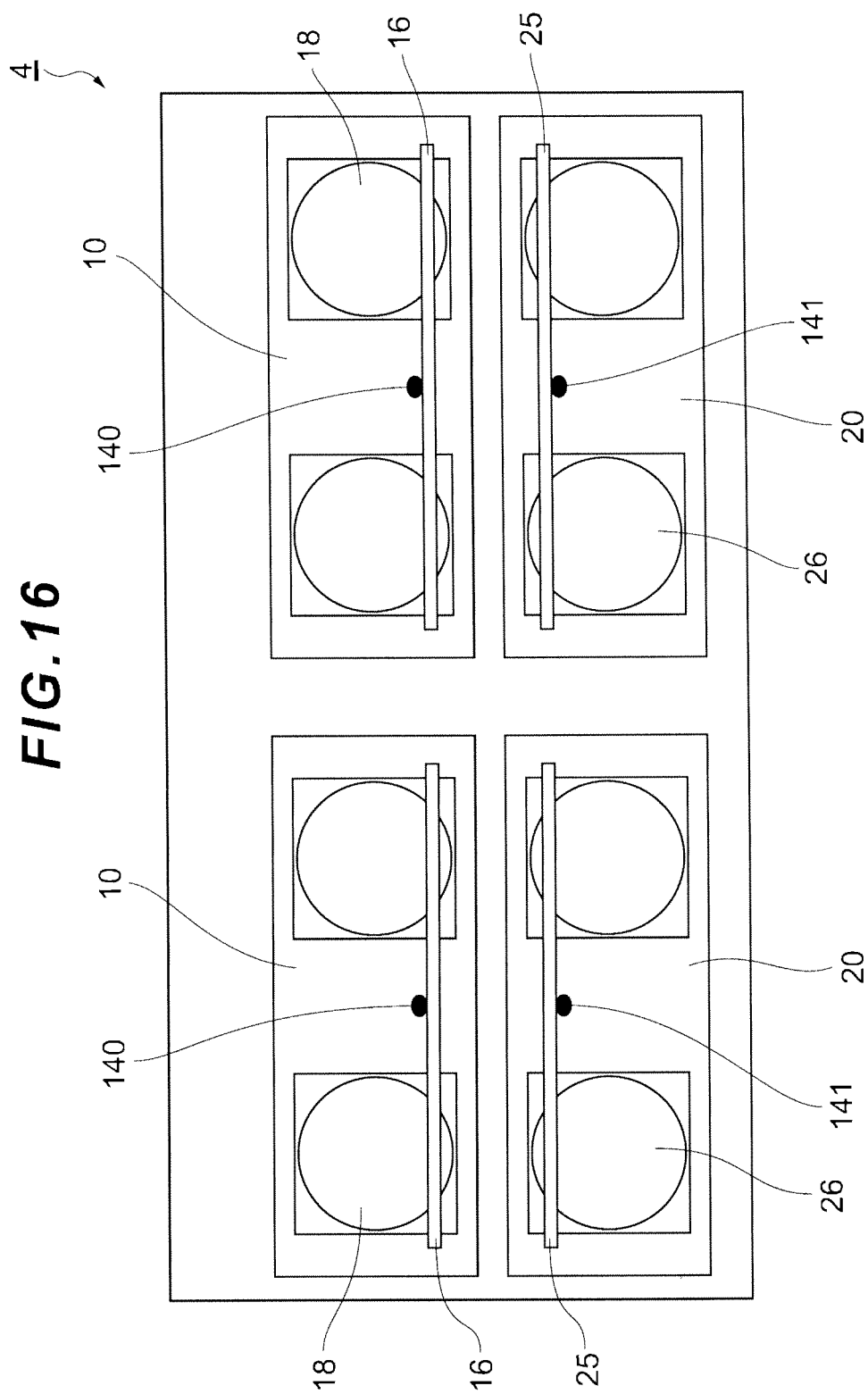
FIG. 16 is a block diagram showing an example of the configuration of a temperature sensor according to this embodiment.

Further, as shown in FIG. 16, the temperature sensors 140, 141 are each mounted on the respective printed wiring boards 16, 25 of the main package box 10 and main processor package box 11 according to this embodiment, and the main package box 10 and main processor package box 11 detect the intake temperatures of the fan assemblies 18, 26 on the basis of the temperature sensors 140, 141.

Furthermore, the CPU chips 10, 22 control the rotation of the fan assemblies 18, 26 according to the temperatures determined by the temperature sensors 140, 141 and, by raising or lowering the rotational speed where necessary, the interior of the main package box 10 and main processor package box 11 can be kept at a suitable temperature.

Figure 17:
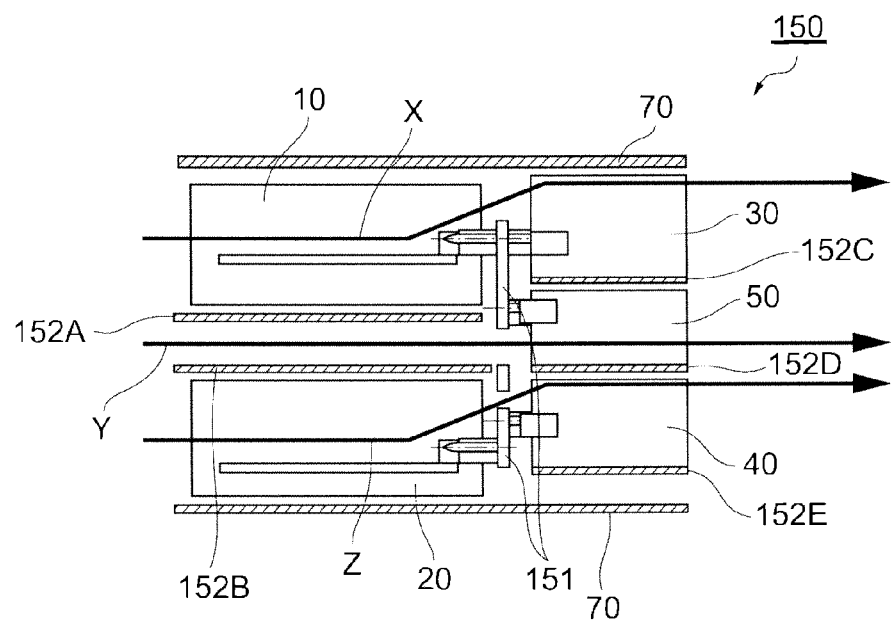
FIG. 17 is a cross-sectional view showing a flow path of the cooling air in a conventional control unit.

FIG. 17, in which the same reference signs are assigned to parts corresponding to FIG. 3, shows an example of the configuration of the conventional control unit 150. A conventional control unit 150 is configured in the same way as the control unit 4 according to this embodiment except that the dispositional configuration of the main processor package box 20 housed in the shelf 80B of the control unit 4 and the configuration of the shelf 152, according to this embodiment, are different.

As shown in FIG. 17, flow path X is a flow path which takes in air using the main package box 10 and which exhausts heat outside the control unit 150 via the interface package box 30.

Furthermore, the flow path Y is a flow path which takes in air via the passage between the main package box 10 and main processor package box 20, and which exhausts heat outside the control unit 150 through the opening 130B in the backboard 151 and via the switching power source package box 50.

The flow path Z is a flow path which takes in air using the main processor package box 20 and which exhausts heat outside the control unit 150 through an opening provided separately from the opening 130B in the backboard 151 and via the main processor package box 20.

In the control unit 150, there is a problem in that the air stream cooling the main processor package box 20 in the flow path Z interferes with the flow path Y and in that the cooling efficiency of the flow path Y is poor. There is a further problem in that the air stream cooling the main processor package box 20 cannot be exhausted in a satisfactory manner and the cooling efficiency of the flow path Z is poor. Hence, in the control unit 4 according to this embodiment, the cooling efficiency in flow paths Y and Z can be improved. Details of the control unit 4 according to this embodiment will be provided hereinbelow.

Figure 18:
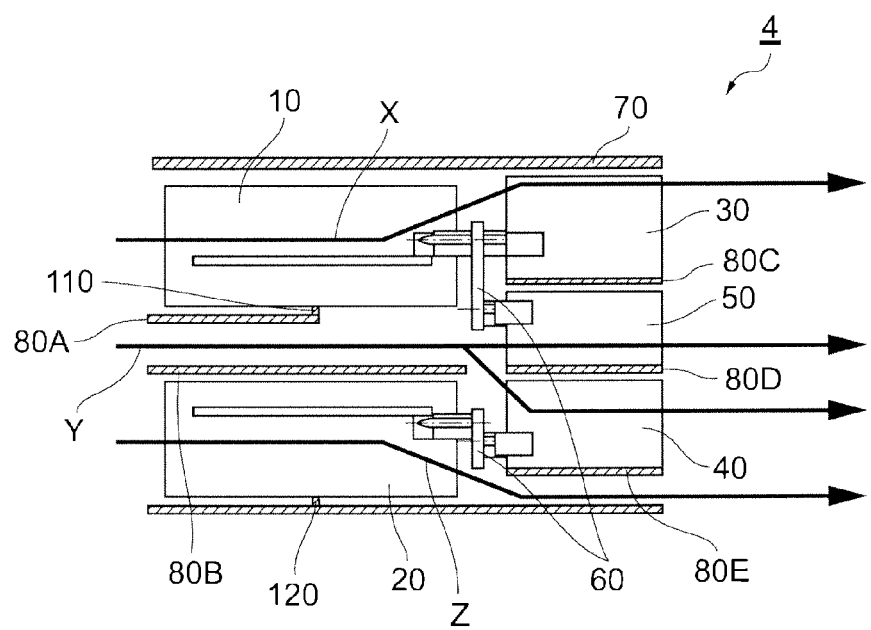
FIG. 18 is a cross-sectional view showing a flow path of the cooling air stream in the control unit according to this embodiment.

As shown in FIG. 18, this control unit 4 is configured such that the printed wiring board 25 of the main processor package box 20 is attached to the side of the shelf 80B, that is, the main processor package box 20 is attached to the backboard 60 in an inverted state and, consequently, the air stream which cools the main processor package box 20 is exhausted outside the control unit 4 through the gap 130C formed by the lower portion of the backboard 60 and the unit cover 70 and via a service processor package box 40. The cooling efficiency of the flow path Z improves as a result.

Furthermore, since the flow path Z does not interfere with flow path Y, the cooling efficiency also improves in flow path Y.

Figure 19:
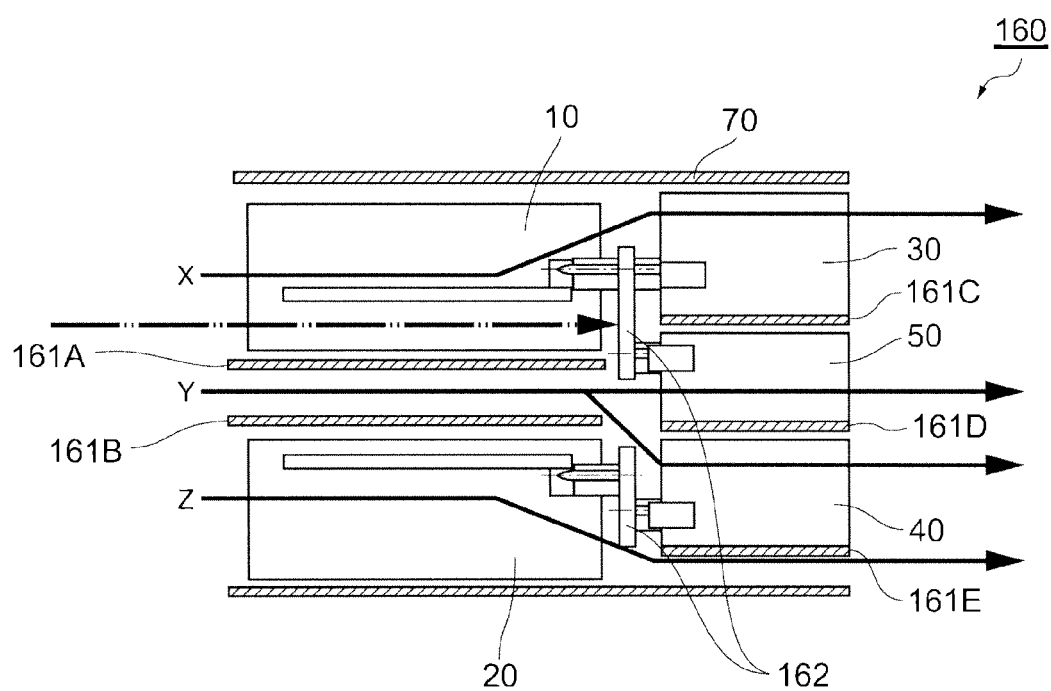
FIG. 19 is a cross-sectional view showing a flow path of the cooling air in a conventional control unit.

Hence, as shown in FIG. 19, also in conventional control unit 160, the cooling efficiency improves in the flow paths Y and Z as a result of the main processor package box 20 being attached to the backboard 160 in an inverted state.

However, since there is no opening in the lower surface of the shelf 161A which houses the main package box 10, the flow path for exhausting the air stream cooling the main package box 10 in flow path X is then only between the backboard 162 and the unit cover 70 of the control unit 160. There is therefore a problem in that the cooling efficiency of the flow path X is poor.

Here, a case where the cooling efficiency of flow path X in the control unit 4 is improved by using the shelf 80 according to this embodiment will be described by way of comparison with the conventional control unit 160.

The cooling efficiency in flow path X can therefore be improved in the control unit 4 according to this embodiment. Details of the control unit 4 according to this embodiment will be provided hereinbelow.

Figure 20:
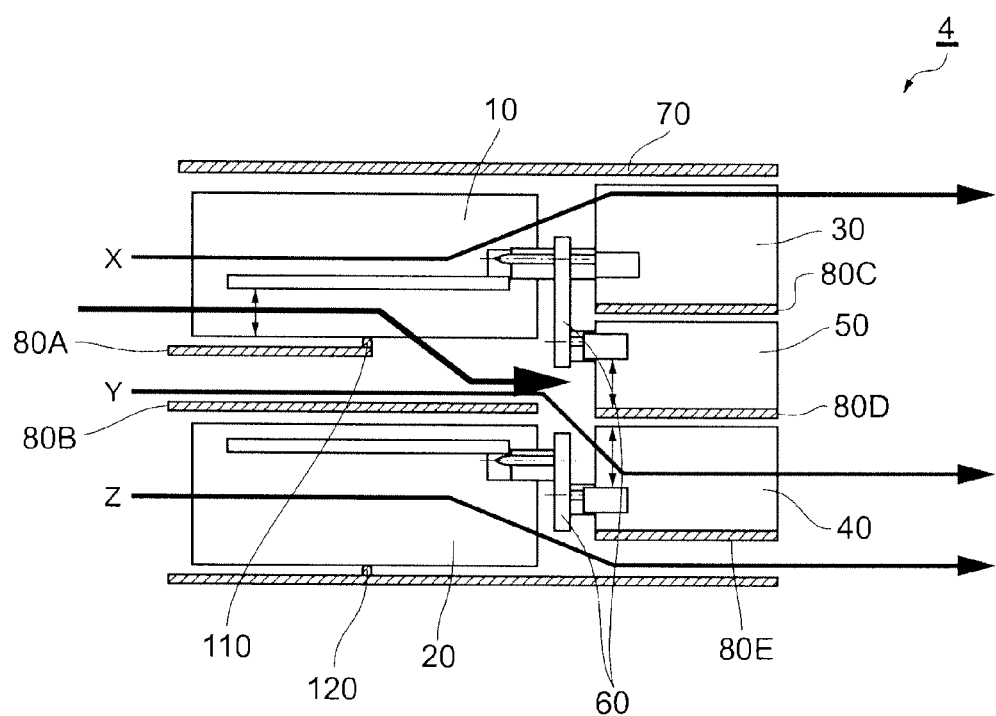
FIG. 20 is a cross-sectional view showing a flow path of the cooling air in the control unit according to this embodiment.
Figure 21:
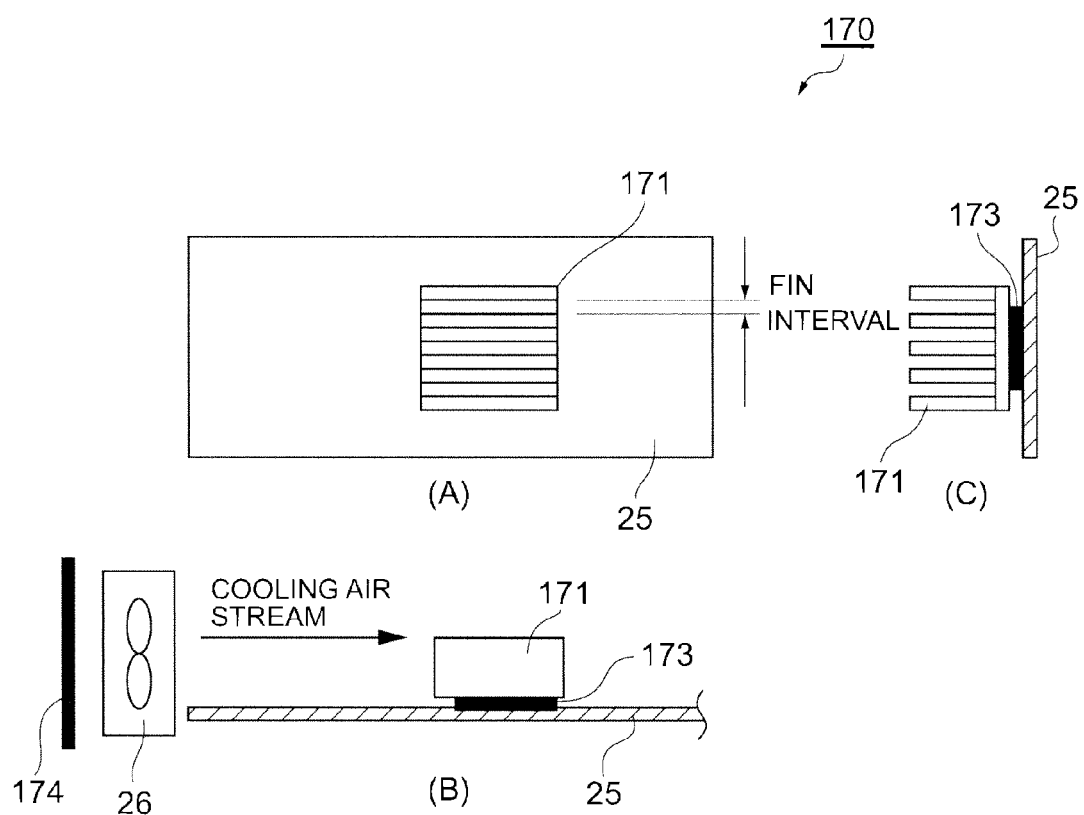
FIG. 21A is a top view showing an example of the configuration of a conventional heat sink.
FIG. 21B is a block diagram illustrating a dust removal function for a conventional main processor package box.
FIG. 21C is a front view showing an example of the configuration of a conventional heat sink.
Figure 22:
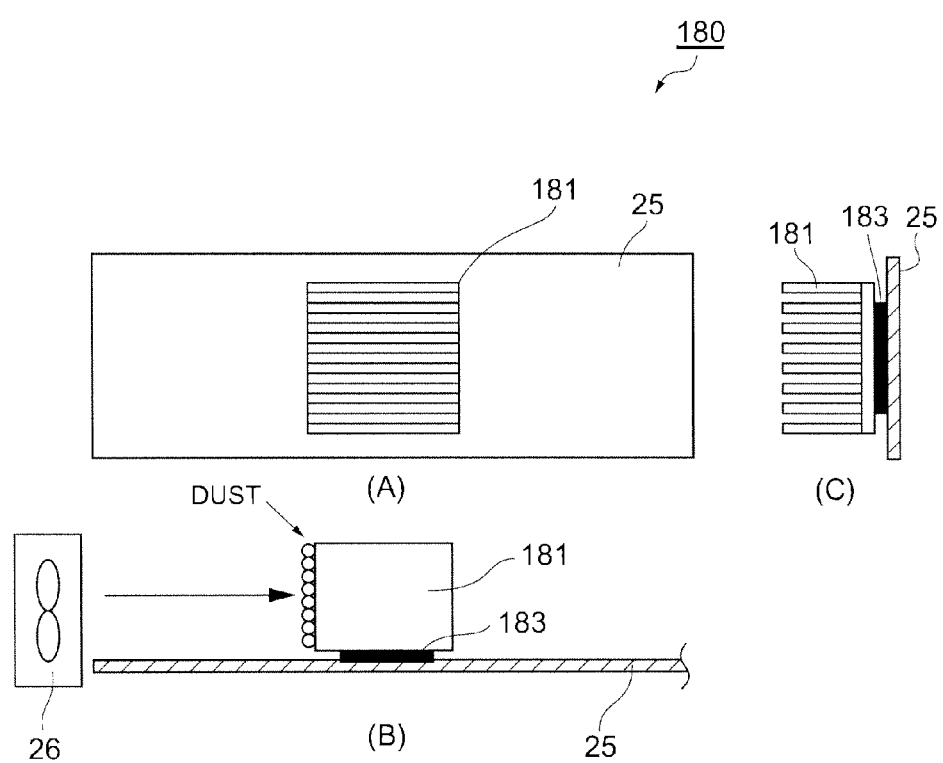
FIG. 22A is a top view showing an example of the configuration of a conventional heat sink.
FIG. 22B is a block diagram illustrating a dust removal function for a conventional main processor package box.
FIG. 22C is a front view showing an example of the configuration of a conventional heat sink.

As shown in FIG. 20, the control unit 4 is configured such that, by making the shelf 80A housing the main package box 10 shorter in the depth direction, the air which is taken in via the main package box 10 passes through the gap formed by the shelf 80A and the backboard 60, and the heat is exhausted outside the control unit 4 via the switching power source package box 50 or the service processor package box 40. The cooling efficiency in the flow path X can thus be improved.

(4) Measure for Preventing Dust in the Main Processor Package Box

A dust-prevention measure which is applied to the main processor package box 20 will be described next using FIGS. 21 to 26. In so doing, conventional technology will first be described.

As shown in FIGS. 21A and 21C, in a conventional main processor package box 170, there is a small number of fins 172 serving as the heat sink 171, and a wide gap is used between the fins 172. Furthermore, as shown in FIG. 21B, in a conventional main processor package box 170, a filter 174 is provided on an air intake surface of the fan assembly 26 and air is drawn into the main processor package box 170 after being filtered via the filter 174. Thus, in a conventional main processor package box 170, the structure is such that dust does not readily adhere or accumulate between the surface opposite the fan assembly 26 of the heat sink 171, and the fins 172 of the heat sink 171.

Furthermore, recent years have seen an increase in the data transfer speeds and processing speeds of disk array devices, and the amount of heat generated in the CPU has increased in step with the higher mounting density of the electronic parts on printed wiring boards. Further, in the disk array devices of recent years, as illustrated in FIGS. 22A, 22B, and 22C, a heat sink 181 which is disposed on a CPU chip 183 in a main processor package box 180 is also larger, there is a large number of fins 182 in the heat sink 181, and the gap between the fins 182 is also narrow. Furthermore, it is thought that, going forward, disk array devices will be installed not only in clean rooms such as machine rooms but also in places where no dust-proof equipment exists such as offices.

Given this situation, in a case where a heat sink 181 with a conventional structure such as that described above is applied, dust readily accumulates between the fins 182 of the heat sink 181 and there is a risk of a drop in cooling performance of the heat sink 181. Further, if there is a drop in the cooling efficiency of the heat sink 181, the temperature of the CPU chip 183 rises, and there is a problem in that this is a source of damage to the CPU chip 183 or causes same to not work properly.

Figure 23:
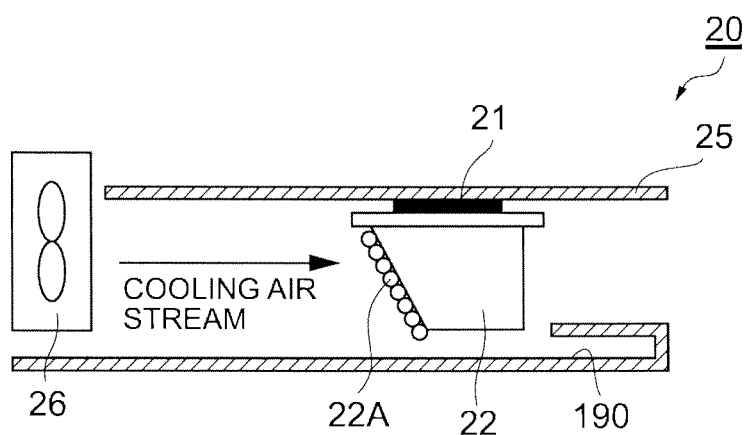
FIG. 23 is a block diagram illustrating a dust removal function for a main processor package box according to this embodiment.
Figure 24:
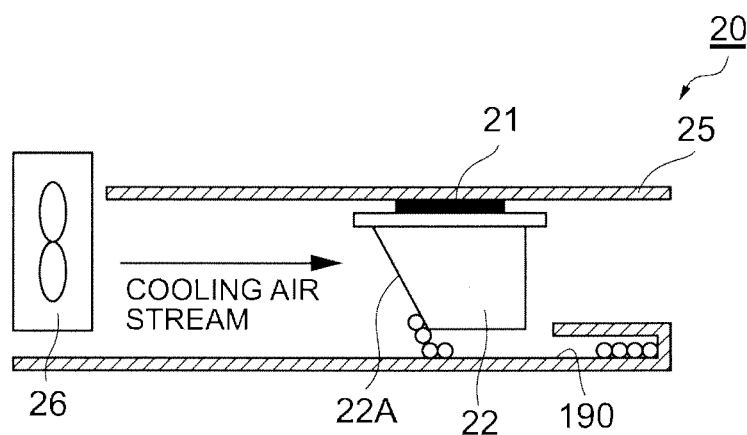
FIG. 24 is a block diagram illustrating the dust removal function for a main processor package box according to this embodiment.
Figure 25:
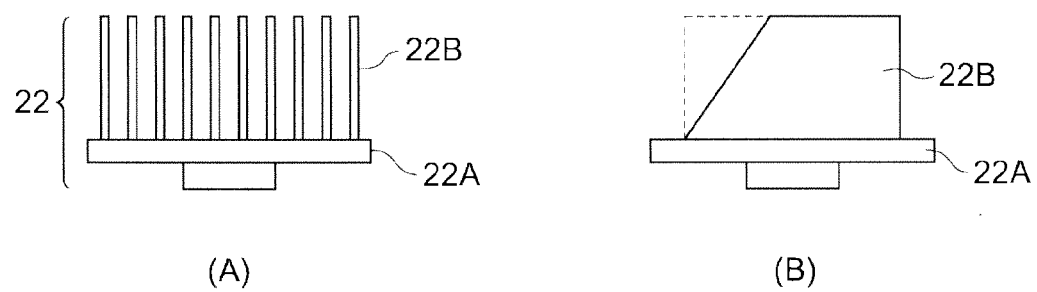
FIG. 25A is a front view showing an example of the configuration of the heat sink according to this embodiment.
FIG. 25B is a lateral view showing an example of the configuration of the heat sink according to this embodiment.

Hence, in the control unit 4 according to this embodiment, a drop in the cooling performance of the heat sink 22 is prevented by devising a structure for the heat sink 22 as shown in FIGS. 23 and 24.

In reality, in the case of this embodiment, as shown in FIG. 25A, the heat sink 22 of the main processor package box 20 is configured such that plate-like fins 22B are formed on one side of a plate-like base 22A in a plurality at fixed intervals and perpendicular to the base 22A. Furthermore, as shown in FIG. 25B, the fins 22B are generally formed having a trapezoidal plate shape with the edge opposite the fan assembly 26 cut away so as to narrow toward the tip. Accordingly, as shown in FIGS. 23 and 24, the cooling air stream which is drawn into the main processor package box 20 from the outside by the fan assembly 26 is able to flow along the tapered end face (hereinafter called the tapered surface) 22A opposite the fan assembly 26 of each fin 22B of the heat sink 22 such that dust is prevented from readily adhering to the tapered surface of each fan 22A of the heat sink 22.

Figure 26:
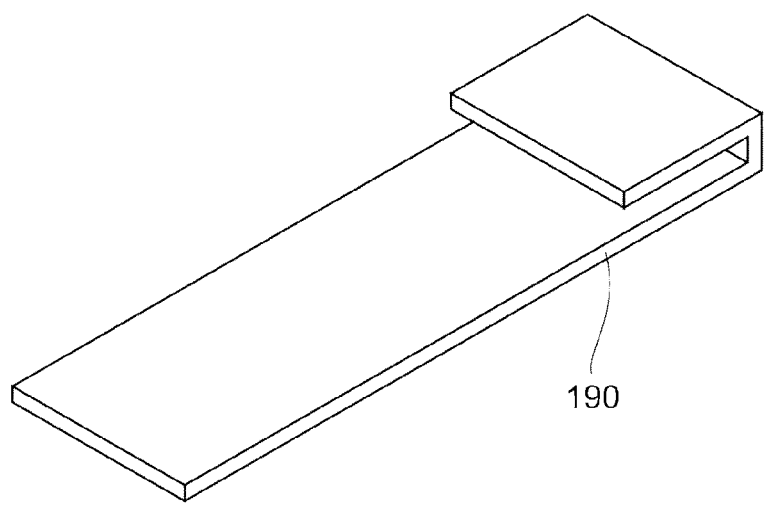
FIG. 26 is a perspective view showing an example of the configuration of a dust collection section according to this embodiment.

Furthermore, a lid which forms the bottom surface of the enclosure of the main processor package box 20 is provided with a dust collection portion 190 which is obtained by bending the back portion into a C shape, as shown in FIG. 26. As a result, in the control unit 4, dust that has been blown in by the cooling air stream as described earlier can be accumulated in the dust collection portion 190.

(5) Fan Air Flow Control Function

As described earlier, although the main processor package box 20 has a structure in which dust does not readily adhere to the fins 22B of the heat sink 22, a small amount of dust will inevitably accumulate between the fins 22B of the heat sink 22 during long usage periods even when this structure is adopted.

In this case, since the cooling efficiency of the heat sink 22 drops when dust accumulates between the fins 22B of the heat sink 22, the temperature of the CPU chip 21 also rises. Therefore, in the main processor package box 20, a temperature sensor (not shown) is formed on the CPU chip 21 and there is a built-in fan air flow control function whereby the CPU chip 21 controls the fan assembly 26 to raise the rotational speed of the fan if the temperature of the CPU chip 21 detected by the temperature sensor is higher than the temperature preset by the user (hereinafter called the threshold temperature).

FIG. 27 shows a processing routine for fan air flow control processing which is executed by the CPU chip 21 for this fan air flow control function. The CPU chip 21 controls the fan speed of the fan assembly 26 in accordance with the processing routine shown in FIG. 27.

In other words, when the main processor package box 20 is started up, the CPU chip 21 starts the fan air flow control processing and first determines whether or not the fan assembly 26 has failed on the basis of a fault generation signal which is generated by the fan assembly 26 (SP1). Further, upon obtaining an affirmative result in this determination, the CPU chip subsequently waits for the failure of the fan assembly 26 to improve.

If, on the other hand, a negative result is obtained in the determination of step SP1, the CPU chip 21 acquires its own temperature which is detected by the temperature chip 141 (FIG. 16) which is provided thereon and determines whether or not this temperature is equal to or less than the threshold temperature (SP2).

Upon obtaining an affirmative result in this determination, the CPU chip 21 terminates the fan air flow control processing after controlling the fan assembly 26 (SP3) so that the fans rotate at E revolutions per second. Note that E revolutions per second denotes the number of revolutions of the fan per unit of time during normal operation.

If, on the other hand, a negative result is obtained in the determination of step SP2, the CPU chip 21 controls the fan assembly 26 to rotate the fans by G (E is less than G) revolutions per second (SP4). As a result, the fans of the fan assembly 26 is rotated at a higher rotational speed than normal and the air flow of the cooling air stream which is drawn into the main processor package box 20 by the fan assembly 26 increases accordingly.

Further, the CPU chip 21 then waits for a predetermined time to elapse and, when the predetermined time has elapsed, the CPU chip 21 controls the fan assembly 26 so that the fans rotate at E revolutions per second (SP4). The rotational speed of the fans of the fan assembly 26 is restored to E revolutions per second which is the normal rotational speed and consequently the air flow of the cooling air stream which is drawn into the main processor package box 20 by the fan assembly 26 is also restored to the normal air flow amount. The CPU chip 2 subsequently ends the fan air flow amount control processing.

(6) Effects of the Embodiment

As mentioned earlier, with the control unit 4 according to this embodiment, in a case where the connector 61A of the backboard 60 is installed displaced from the standard position 62 due to erection tolerance, the connectors 15, 24 of the main package box 10 and main processor package box 20 can be made to mate with the connectors 61A, 61B of the corresponding backboard 60 by providing protrusions 110, 120 on the edge of the backboard 60 side of the shelf 80A and the inside lower surface of the unit cover 70, thus preventing connection problems between the main processor package box 20 and the backboard 60 and damage to the connectors 61 on the backboard 60.

With the control unit 4, in a case where the amount of heat generated by the CPU chip 12 in the main package box 10 increases, a new flow path is provided in order to vent the heat generated in the main package box 10 and enable improved cooling efficiency of the whole control unit 14 overall.

Moreover, with the control unit 4, if the interval between the fin 22B in the main processor package box 20 is narrow, the dust between the fin 22B of the heat sink 22 can be prevented from sticking readily, thereby improving the cooling efficiency of the control unit 4 as a whole.

Furthermore, with the control unit 4, if dust collects between the fin 22B in the main processor package box 20, the cooling efficiency of the whole control unit 4 can be improved by using a cooling air stream from the fan assembly 26 to vent the dust.

(7) Further Embodiments

Figure 7:
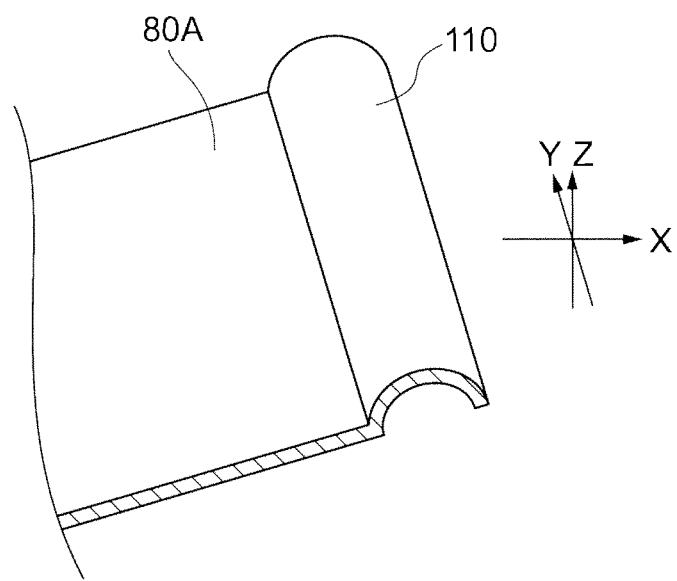
FIG. 7 is a perspective view showing an example of the configuration of protrusion according to this embodiment.
Figure 8:
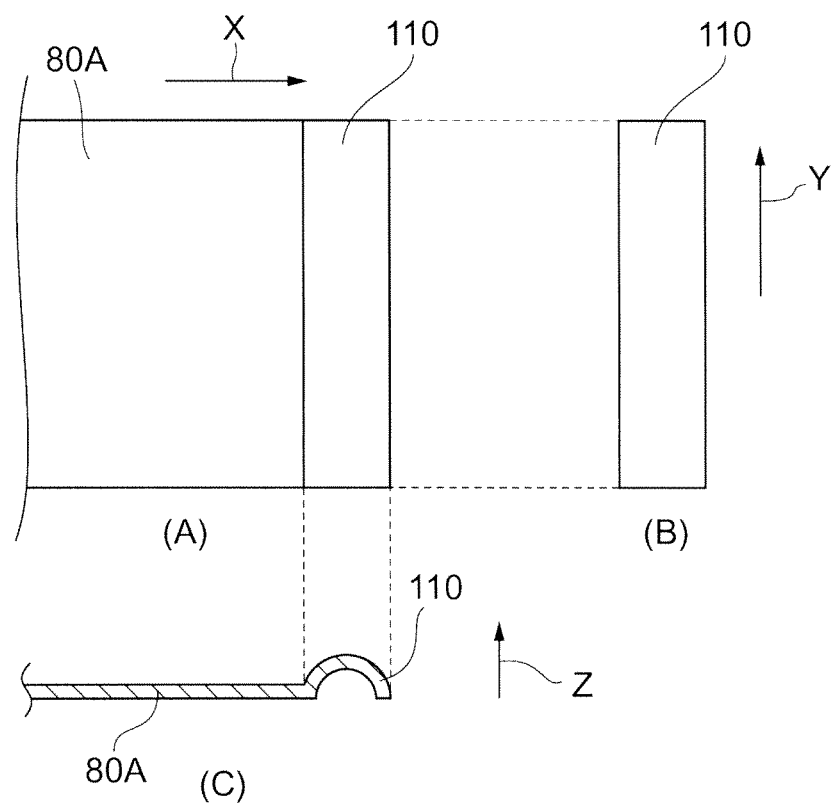
FIG. 8A is a top view showing an example of the configuration of a protrusion according to this embodiment.
FIG. 8B is a lateral view showing an example of the configuration of the protrusion according to this embodiment.
FIG. 8C is a cross-sectional view showing an example of the configuration of the protrusion according to this embodiment.

Note that, although a case was described in the foregoing embodiment in which the protrusion 110 as shown in FIGS. 7 and 8 is formed through crushing and bending on the edge of the backboard 60 side of the shelf and on the lower inside surface of the unit cover 70, the present invention is not limited to such a case. The protrusion may be formed by folding as per FIG. 28A or the protrusion may be formed by welding as per FIG. 28B.

Moreover, in the foregoing embodiment, a case is described in which the length, in the depth direction of the shelf 80A whereon the main package box 10 (first package box) is mounted, is selected so that the edge on the backboard side is positioned on a straight line perpendicular to the depth direction of the unit cover 70 and passing through the lower side at the gravity center of the main package box 10 when the connector 15 (first connector) of the main package box 10 is mated with the connector 61A (second connector) of the backboard 60. However, the present invention is not limited to such a case, rather, the length in the depth direction of the shelf 80A may also be another length. Furthermore, in this case, the protrusion 110 of the shelf 80A may also be provided at a point other than the end on the backboard 60 side of the shelf 80A, in other words, as long as the protrusion 110 is formed so as to lie on a straight line perpendicular to the depth direction of the unit cover 70 and passing through the lower side at the gravity center of the main package box 10 when the connector 15 of the main package box 10 is mated with the connector 61A of the backboard 60, the formation position may be provided at a point other than the end on the backboard 60 side of the shelf 80A.

In addition, in the foregoing embodiment, a case was described where the protrusion 110 is provided on the shelf 80A whereon the main package box 10 (first package box) is mounted so as to lie on the lower side at the gravity center of the main package box 10 when the connector 15 (first connector) of the main package box 10 is mated with the connector 61A (second connector) of the backboard 60 or a case was described where the protrusion 120 is provided on the inside lower side of the unit cover 70, whereon the main processor package box 20 (second package box) is mounted, so as to be positioned on the lower side at the gravity center of the main processor package box 20 when the connector 24 (third connector) of the main processor package box 20 is mated with the connector 61B (fourth connector) of the backboard 60; however, the protrusions 110, 120 may not necessarily lie at the gravity center of the main package box 10 or main processor package box 20 and may instead be positioned on the lower side close to the gravity center.

Furthermore, although a case was described in the foregoing embodiment in which a shelf 80 which is formed integrally with the unit cover 70 is formed from a metallic material, the present invention is not limited to such a case, rather, the shelf 80A may instead be formed from a material other than a metallic material such as plastic, for example. In this case, the protrusion 110 may also be integrally molded with the shelf 80A using mold injection or the like.

Further, although a case was described in the foregoing embodiment in which the heat sink 22 of the main processor package box 20 is formed with an overall trapezoidal shape such that the edge opposite the fan assembly 26 is cut away so as to narrow toward the tip, the present invention is not limited to such a case, rather, as long as the surface opposite the fan assembly 26 is formed with a tapered shape, the heat sink 22 may be formed to have any shape.

Further, although a case was described in the above embodiment in which the CPU chip 21 controls the fan assembly 26 to raise the rotational speed of the fan assembly 26 if the temperature of the CPU chip 21 detected by the temperature sensor 141 is higher than the temperature preset by the user, the present invention is not limited to such a case, rather, the CPU chip 21 may also control the fan assembly 26 to raise the rotational speed of the fan assembly 26 if the temperature is higher than a predetermined temperature, for example.

Moreover, a case was described in the above embodiment in which, due to the protrusion 110 of the shelf 80A, the main package box 10 is fanned in the direction of rotation (fan direction) about an axis parallel to the upper surface of the shelf 80A and perpendicular to the depth direction of the unit cover 70, but the present invention is not limited to such a case. In other words, as long as the main package box 10 can be rotated in a direction in which the connector 15 of the main package box 10 can be displaced in an upward/downward direction, the fan direction may be a direction other than the direction of rotation about the axis parallel to the upper surface of the shelf 80A and perpendicular to the depth direction of the unit cover 70.

INDUSTRIAL APPLICABILITY

The present invention can be applied to a control unit which is mounted by way of a mutual connection with a backboard connector by being mated with the connector.

REFERENCE SIGNS LIST

1 Disk array device
2 System rack
3 Disk unit
4 Control unit
10 Main package box
20 Main processor package box
30 Interface unit
40 Service processor
50 Switching power source
60 Backboard
70 Unit cover
80A, 80B, 80C, 80D, 80E Shelf
18, 26 Fan assembly
13, 22 Heat sink
190 Dust collection portion
200 Fan

The invention claimed is:

1. A controller, comprising:
a first package box which comprises a predetermined function and on a rear side of which a first connector is provided;
a unit cover which is open at least one end in a depth direction, an interior of which is partitioned by a shelf into a plurality of spatial areas, and in which the first package box is inserted into the corresponding spatial area so as to move over the shelf from the open end; and
a backboard which is disposed inside the unit cover and on which a second connector is provided in a position where the first package box, inserted in the corresponding spatial area, mates with the first connector,
wherein the shelf is provided with a protrusion which rotatably supports the first package box in a fan direction.

2. The controller according to claim 1,
wherein the protrusion of the shelf is formed such that, when the first connector of the first package box is mated with the second connector of the backboard, the protrusion is positioned on a straight line perpendicular to the depth direction of the unit cover and passing through the lower side at the gravity center of the first package box.

3. The controller according to claim 2,
wherein the length in the depth direction of the shelf is selected so that, when the first connector of the first package box is mated with the second connector of the backboard, the edge of the backboard is positioned on a straight line perpendicular to the depth direction of the unit cover and passing through the lower side in the gravity direction at the gravity center of the first package box,
wherein the protrusion is formed on the backboard-side edge of the shelf.

4. The controller according to claim 1, further comprising:
a second package box which comprises a predetermined function and on the rear side of which a third connector is provided;
wherein the second package box is housed in the unit cover so as to be inserted into the corresponding spatial area from the open end of the unit cover,
wherein the backboard is provided with a fourth connector in a position where the second package box, inserted in the spatial area, mates with the third connector,
wherein the second package box contains:
a fan assembly which draws air into the first package box as a cooling air stream;
a printed wiring board whereon a CPU (Central Processing Unit) chip for drive-controlling the fan assembly is mounted; and
a heat sink which is fixed to the CPU chip and which cools the CPU chip, and
wherein the heat sink comprises a plurality of fins and the edge opposite the fan assembly of each of the fins is formed with a tapered end face that is cut away so as to narrow toward the tip.

5. The controller according to claim 4,
wherein the second package box comprises a temperature sensor which detects the temperature of the CPU chip, and
wherein the CPU chip performs control to raise the rotational speed of the fans of the fan assembly if the temperature of the CPU chip detected by the temperature sensor is higher than a predetermined temperature.

6. The controller according to claim 4,
wherein the CPU chip is mounted on the side opposite the gravity direction of the printed wiring board,
wherein the heat sink is fixed to the surface of the CPU chip opposite the surface for mounting the CPU chip on the printed wiring board, and
wherein the second package box comprises a dust collection portion which collects dust that is blown from the heat sink by the cooling air stream.

7. The controller according to claim 4,
wherein the second package box is such that the printed wiring board is disposed in an inclined position on the upper surface inside the second package box, and
wherein a gap is formed between the backboard and the inside bottom surface of the unit cover.

\* \* \* \* \*